(12) United States Patent
Patwardhan et al.

(10) Patent No.: US 10,044,427 B2
(45) Date of Patent: *Aug. 7, 2018

(54) ENHANCING MU-MIMO TO GROUP CLIENTS ACROSS MULTIPLE BSSIDS FOR A PHYSICAL RADIO

(71) Applicant: Aruba Networks, Inc., Sunnyvale, CA (US)

(72) Inventors: Gaurav Patwardhan, Santa Clara, CA (US); Kiran Ashokan, Santa Clara, CA (US); Mohd Shahnawaz Siraj, Santa Clara, CA (US); Satish Damodaran, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,804

(22) Filed: Nov. 16, 2017

(65) Prior Publication Data

US 2018/0083685 A1  Mar. 22, 2018

Related U.S. Application Data

(63) Continuation of application No. 15/495,669, filed on Apr. 24, 2017, now Pat. No. 9,825,684, which is a
(Continued)

(51) Int. Cl.
*H04B 7/02* (2018.01)
*H04B 7/06* (2006.01)
(Continued)

(52) U.S. Cl.
CPC ......... *H04B 7/0626* (2013.01); *H04B 7/0417* (2013.01); *H04B 7/0452* (2013.01); *H04B 7/0617* (2013.01); *H04B 7/0632* (2013.01)

(58) Field of Classification Search
CPC ..... H04L 1/0618; H04L 1/06; H04L 25/0204; H04L 25/4902; H04L 1/0009;
(Continued)

(56) References Cited

U.S. PATENT DOCUMENTS

| | | | |
|---|---|---|---|
| 2014/0112246 A1* | 4/2014 | Park ................... | H04W 74/002 370/328 |
| 2014/0362840 A1* | 12/2014 | Wong ................... | H04W 88/06 370/338 |

(Continued)

*Primary Examiner* — Zewdu Kassa
(74) *Attorney, Agent, or Firm* — Hewlett Packard Enterprise Patent Department

(57) ABSTRACT

MU-MIMO provides a mechanism for a wireless network device to transmit to multiple client devices at the same time. When employing MU-MIMO, a network device may group two or more associated client devices, and transmit beamformed signals to each group. In some implementations, a network device may initiate channel sounding. Channel sounding may include transmitting sounding frames to client devices associated with two or more basic service sets. Channel sounding may facilitate beamforming transmissions to client devices associated with the two or more basic service sets. The network device may receive feedback frames from client devices associated with the two or more basic service sets. A feedback frame may indicate how a sounding frame was received. In some implementations, the network device may further construct a feedback table from the feedback frames. The feedback table may facilitate grouping of the client devices for beamforming transmissions.

20 Claims, 18 Drawing Sheets

Related U.S. Application Data continuation of application No. 14/743,734, filed on Jun. 18, 2015, now Pat. No. 9,634,745.

(51) Int. Cl.
  *H04B 7/0452* (2017.01)
  *H04B 7/0417* (2017.01)

(58) Field of Classification Search
  CPC ..... H04L 1/0041; H04L 25/49; H04B 7/0417; H04B 7/0669; H04B 3/54
  USPC ................ 375/267, 260, 259, 316, 295, 219
  See application file for complete search history.

(56) References Cited

U.S. PATENT DOCUMENTS

| | | | |
|---|---|---|---|
| 2015/0030094 A1* | 1/2015 | Zhang | .................. H04B 7/0456 375/267 |
| 2015/0094103 A1 | 4/2015 | Wang et al. | |

* cited by examiner

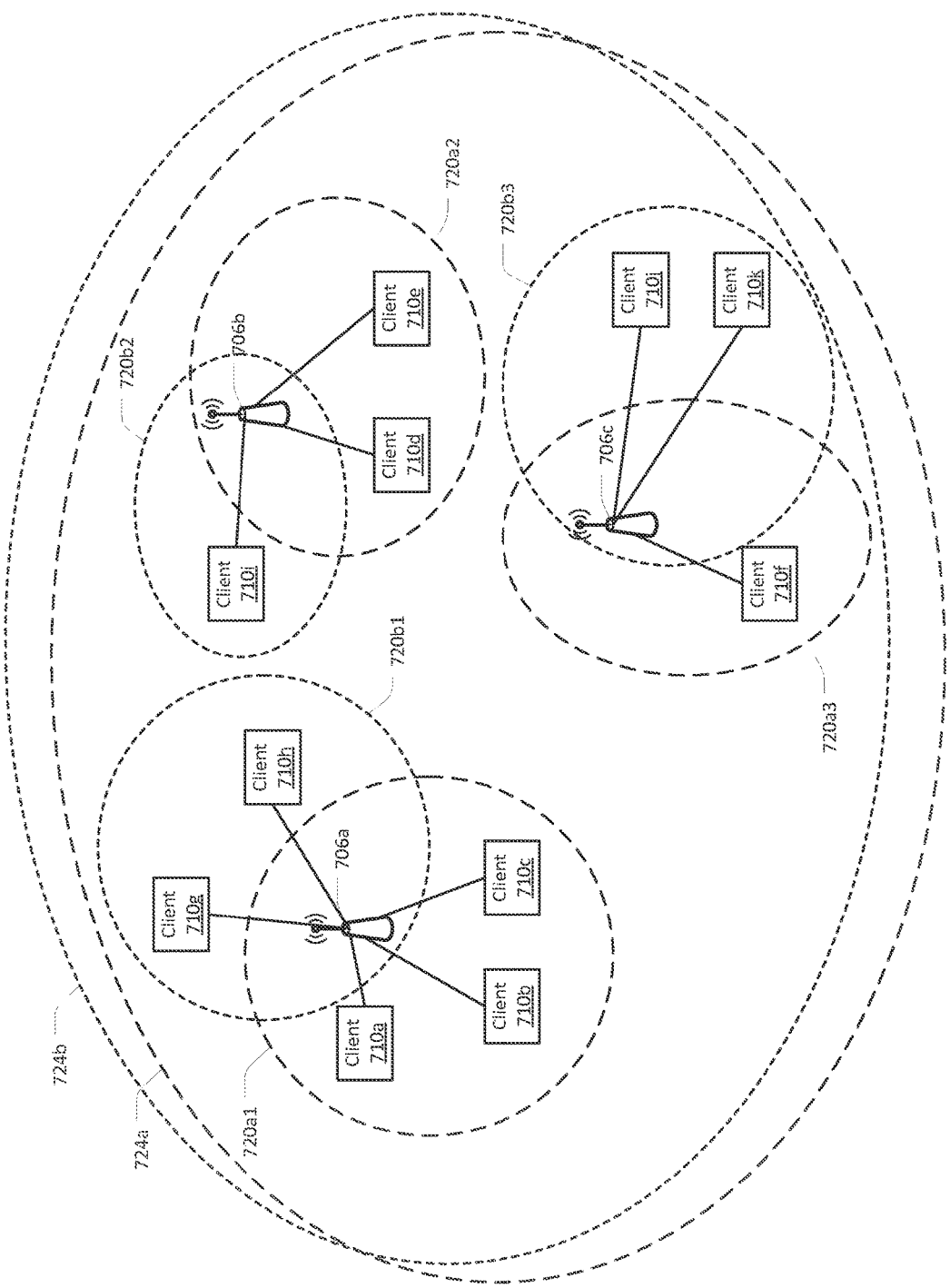

ENHANCING MU-MIMO TO GROUP CLIENTS ACROSS MULTIPLE BSSIDS FOR A PHYSICAL RADIO

PRIORITY APPLICATION INFORMATION

This application is a Continuation of U.S. application Ser. No. 15/495,669 filed on Apr. 24, 2017, which is a Continuation of U.S. application Ser. No. 14/743,734, filed Jun. 18, 2015, and granted on Apr. 25, 2017 as U.S. Pat. No. 9,634,745, the content of which are incorporated herein by reference in its entirety. The Applicant hereby rescinds any disclaimer of claim scope in the parent application or the prosecution history thereof and advises the USPTO that the claims in this application may be broader than any claim in the parent application.

SUMMARY

Multi-User, Multiple-Input and Multiple Output (MU-MIMO) provides a mechanism for a wireless network device to transmit to multiple client devices at the same time. When employing MU-MIMO, a network device may group two or more associated client devices, and transmit beamformed signals to each group.

Provided are devices, computer-program products, and methods (e.g. methods implemented by a network device), for grouping client devices associated with different basic service sets. In some implementations, a network device may initiate channel sounding. In these implementations, channel sounding may include transmitting sounding frames to client devices associated with two or more basic service sets. Channel sounding may facilitate beamforming transmissions to client devices associated with the two or more basic service sets. In some implementations, the network device may receive feedback frames from client devices associated with the two or more basic service sets. In these implementations, a feedback frame may indicate how a sounding frame was received. In some implementations, the network device may further construct a feedback table from the feedback frames. In these implementations, the feedback table facilitates grouping of the client devices for beamforming transmissions.

In some implementations, transmitting sounding frames may further include transmitting an announcement frame. In these implementations, an announcement frame may indicate that channel sounding is starting. In some implementations, transmitting sounding frames may further include transmitting a training frame. In these implementations, a training frame may include training symbols. Furthermore, in these implementations a feedback frame may indicate how the training symbols were received.

In some implementations, transmitting sounding frames may further include transmitting a multi-client sounding frame to a client device. In these implementations, a client device is associated with a basic service set, and the basic service set includes one client device.

In some implementations, the network device may group two or more client devices. In these implementations, the two or more client devices are grouped based on traffic characteristics of frames being transmitted to the two or more client devices. Furthermore, in these implementations, the two or more client devices are associated with two or more basic services sets. In some implementations, the network device may further transmit frames to the grouped client devices using beamformed transmissions.

In some implementations, grouping client devices further includes grouping two or more client devices based on the feedback table. In some implementations, traffic characteristics include a frame size and an inter-arrival time. In some implementations, the network device may queue frames for all client devices associated with the two or more basic service sets into a single queue. In other implementations, the network device may queue frames for grouped client devices into a single queue.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

BRIEF DESCRIPTION OF THE DRAWINGS

Illustrative embodiments are described in detail below with reference to the following figures:

FIG. 7B illustrates an example of a network configuration that includes two, overlapping wireless local area networks;

DETAILED DESCRIPTION

Figure 1:
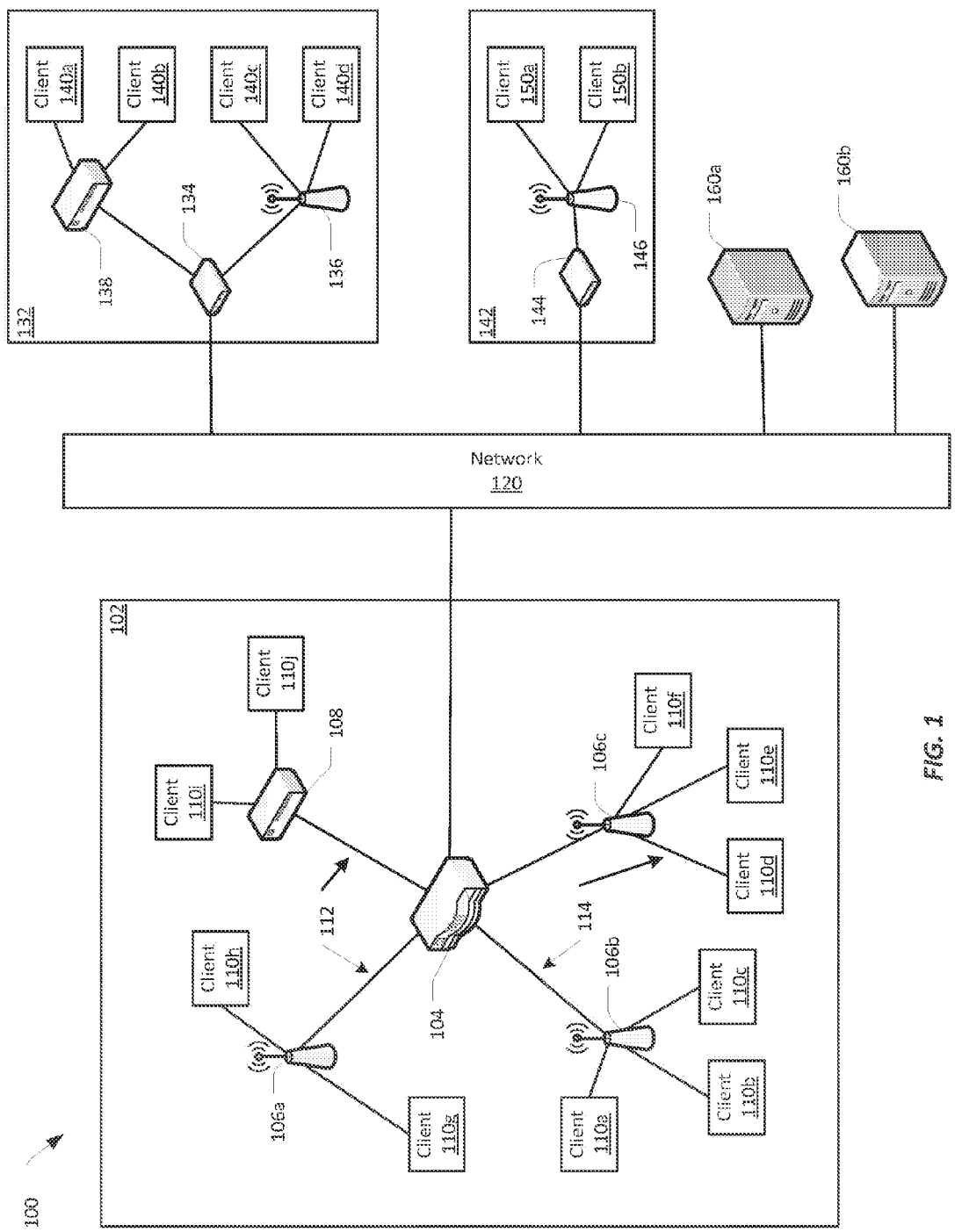
FIG. 1 illustrates one embodiment of a network configuration that may be implemented for a multi-user organization, such as a business, educational institution, governmental entity, or any other organization having multiple users and possibly multiple sites.

Multi-User, Multiple-Input and Multiple Output (MU-MIMO) provides a mechanism for a wireless network device to transmit to multiple client devices at the same time. A wireless network device may be a network device, such as for example an access point, that provides wireless connectivity to a network. Without MU-MIMO enabled, the network device may have to transmit to each associated client devices one at a time. With MU-MIMO, because the network device may be able to transmit to multiple client devices at the same time, the network device may be able to transmit more data more frequently. This may possibly improve the rate of data being transmitted to some or all of the associated client devices. MU-MIMO is defined in the Institute of Electrical and Electronics Engineers (IEEE) 802.11 specification.

When employing MU-MIMO, a network device may group two or more associated client devices, and transmit beamformed signals to each group. MU-MIMO may be more efficient when a group of client devices that are to receive MU-MIMO transmissions are receiving frames with similar traffic characteristics. Because the network device is transmitting to all the client devices at the same time, the transmissions may be more efficient when the frames being transmitted are similar in size. Furthermore, the interval between MU-MIMO transmissions may be minimized when the network device receives incoming frames at about the same time.

The network device may also use sounding information to determine how to group associated client devices. Sounding is a process by which the network device learns about the state of the channel between itself and each associated client device. Sounding may also provide information to the network device about how to beamform signals to each client device. Client devices that are not capable of receiving MU-MIMO transmissions may not provide sounding information, and may be excluded from any MU-MIMO groups. These client devices may receive non-beamformed transmissions, as when MU-MIMO is not enabled by the network device.

MU-MIMO does not address network devices that are able to form more than one basic service set (BSS). A basic service set describes a network device that provides wireless network access and client devices associated with the network device. A network device can be configured with more than one BSS when the network device is included in more than one wireless local area network. Because MU-MIMO does not address network devices that can be configured with more than one BSS, MU-MIMO does not provide a mechanism for grouping client devices that are in different BSS. Without any additional mechanisms, a network device may only group client devices that are in the same BSS. Client devices in different BSS, however, may be suitable for grouping and receiving MU-MIMO transmissions as a group. If not able to consider client devices in different BSS, the network device may be overlooking opportunities to improve data throughput to some or all associated client devices.

Before discussing MU-MIMO, traffic flows, and grouping client devices across BSS, first discussed are systems that may include implementations of MU-MIMO.

I. Network Configurations

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network or a home network. The main office 102 network may be a private network. A private network is a network that may include security and access controls, such that only certain users are authorized to access the private network. Authorized users may include, for example, employees of a company based in the main office 102.

In the illustrated example, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 may be operable to configure and manage network devices, such as at the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a-c. Switches 108 and wireless access points 106a-c provide network connectivity to various client devices 110a-j. Using a connection to a switch 108 or access point 106a-c, a client device 110a-j is able to access network resources, including other devices on the network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, and the like.

Within the main office 102, a switch 108 is included as one example of a point of access to the network for wired client devices 110i-j. Client devices 110i-j may connect to the switch 108 and through the switch 108 may be able to access other devices within the network configuration 100.

The client devices 110*i-j* may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless access points 106*a-c* are included as another example of a point of access to the network for client devices 110*a-h*. An access point 106*a-c* is a combination of hardware, software, and/or firmware that is configured to provide wireless network connectivity to wireless client devices 110*a-h*. In the illustrated embodiment, the access points 106*a-c* can be managed and configured by the controller 104. The access points 106*a-c* communicate with the controller 104 and the network over either wired 112 or wireless 114 connections.

The network configuration 100 may include one or more remote sites 132. A remote site 132 may be located in a different physical or geographical location from the main office 102. In some cases the remote site 132 may be in the same geographical location, or possibly the same building, as the main office, 102, but lacks a direct connection to the network located within the main office 102, relying instead on a connection over a different network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or access point 136 in communication with the gateway device 134 over either wired or wireless connections. The switch 138 and access point 136 provide connectivity to the network for various client devices 140*a-d*.

In various embodiments, the remote site 132 is in direct communication with main office 102, such that client devices 140*a-d* at the remote site 132 access the network resources at the main office 102 as if these clients devices 140*a-d* were located at the main office 102. In such embodiments, the remote site 132 is managed by the controller 104 at the main office, and the controller 104 provides the necessary connectivity, security, and accessibility that enable the remote site's 132 communication with the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150*a-b* access the network 120. Such a remote site 142 may represent, for example, an individual employee's home or a temporary remote office. The remote site 142 may also be in communication with the main office 102, such that the client devices 150*a-b* at remote site 142 access network resources at the main office 102 as if these client devices 150*a-b* were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Figure 2:
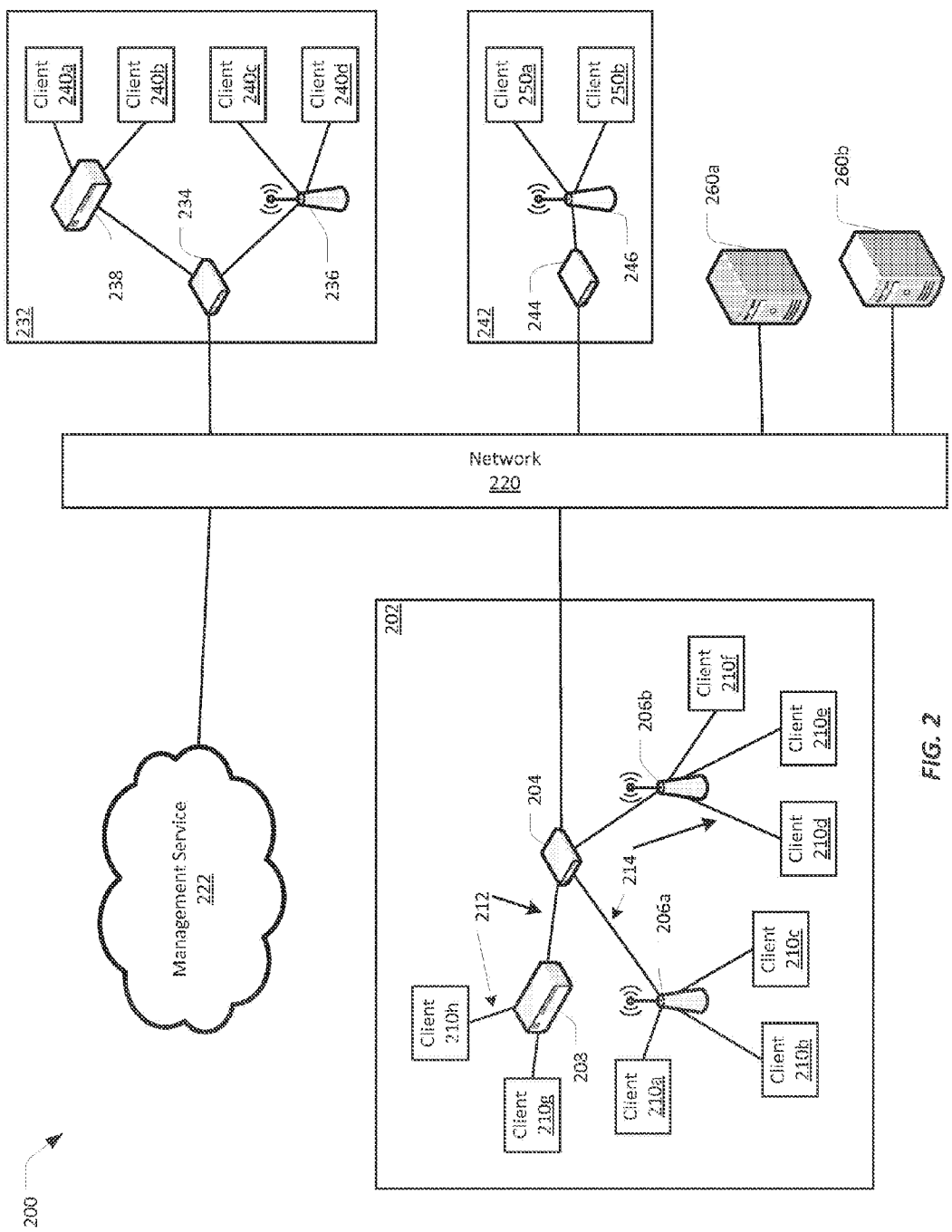
FIG. 2 illustrates an embodiment of a network configuration that includes a cloud-based management service.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206*a-b*. Switches 208 and access points 206*a-b* provide network connectivity to various client devices 210*a-h*. Using a connection to a switch 208 or access point 206*a-b*, a client device 210*a-h* is able to access network resources, including other devices on the network and the network 220.

A switch 208 is included as an example of a point of access to the network for client devices 210*g-h*. Client devices 210*g-h* may communicate with the switch 208 over a wired 212 connection. Wireless access points 206*a-b* are included as another example of a point of access to the network for client devices 210*a-f*. Client devices 210*a-f* may communicate with the access points 206*a-b* over wireless 214 connections. The access points 206*a-b* may themselves communicate with the gateway device 204 over either wired 212 or wireless 214 connections.

In some embodiments, the network configuration 200 may include a cloud-based management service 222. The management service 222 may include various software and software processes for configuring and/or managing network devices at the main office 202. Management tasks may include, for example, access, authentication, security, hardware management, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220.

The network configuration 200 may include one or more remote sites 232, 242. A remote site 232 may include a gateway device 234 for communicating with the network 220. The remote site 232 may also include a switch 238 and/or access point 236 in communication with the gateway device 234 over either wired or wireless connections. The switch 238 and access point 236 provide connectivity to the network 220 for various client devices 240a-d.

In various embodiments, the remote site 232 may be configured and/or managed by the management service 222, such that client devices 240a-d at the remote site 232 access the network resources at the main office 202 as if these clients devices 240a-d were located at the main office 202. The management service 222 provides the necessary connectivity, security, and accessibility that enable the remote site's 232 communication with the main office 202.

In various embodiments, the network configuration 200 may also include one or more smaller remote sites 242, comprising only a gateway device 244 for communicating with the network 220 and a wireless access point 246, by which various client devices 250a-b access the network 220. The remote site 242 may also be configured and/or managed by the management service 222, such that the client devices 250a-b at the remote site 242 access network resources at the main office 202 as if these client devices 250a-b were located at the main office 202. The management service's 222 control over the remote site 242 makes this transparency possible.

The network 220 may be a public network, such as the Internet. The network 220 may include various content servers 260a-b. The client devices 210a-h, 240a-d, 250a-b may request and access data and content provided by the content servers 260a-b over their connection to the network 120.

II. Multiple-Input and Multiple-Output (MIMO)

FIGS. 1 and 2 illustrate that, quite often, multiple client devices associate with one access point. The access point, or a similar network device, should service all associated client devices such that none of the client devices suffer noticeable communication delays. In some implementations, an access point or a similar network device can only communicate with a single client device at a time. In such implementations, the network device may service each associated client device one at a time, and a client device may only transmit and/or receive communications during its turn. In these implementations, however, as the number of client devices associated with a single network device grows, and/or the amount of data communicated to and from each client device increases, the network device may not be able to service each client device sufficiently quickly to avoid noticeable interruptions in the flow of data to a client device.

Figure 3:
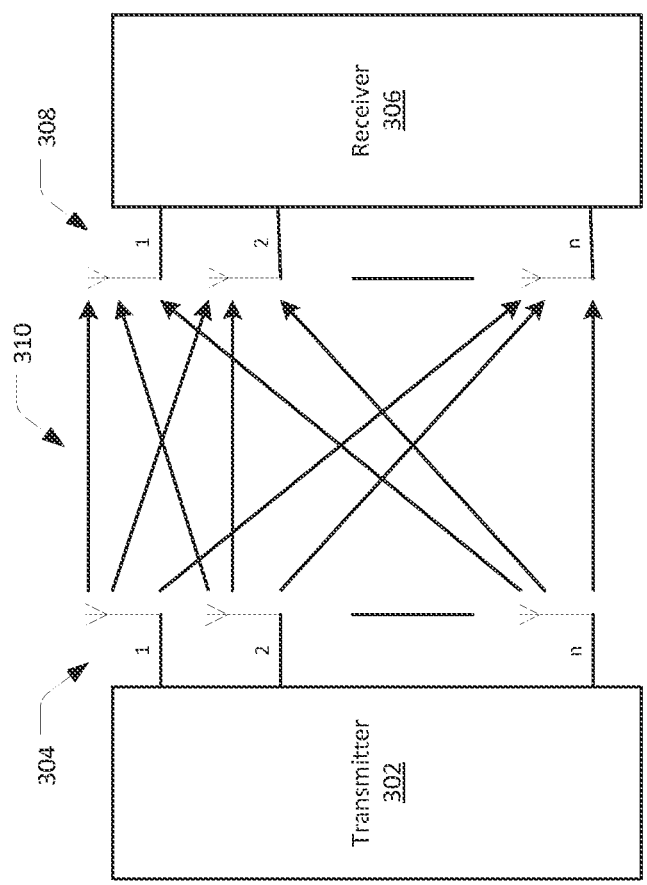
FIG. 3 illustrates generally a MEMO system.

Different technologies have been developed to increase the data throughput from network devices that provide wireless access to client devices. One such technology is multiple-input and multiple output (MIMO). FIG. 3 illustrates generally a MIMO system. A MIMO system uses multiple antennas 304, 308 at both the transmitter 302 and receiver 306 to improve communication performance. Employing multiple antennas has several benefits. For example, the capacity of a radio link can be multiplied by taking advantage of multipath propagation. Multipath propagation in this instanced describes the difference in how the same signal 310, transmitted from different antennas 304, arrives at one or more receiver antennas 308. The channel between the transmitter 302 and the receiver 306 may suffer fading, interference, and other effects that cause a loss in signal quality. Multiple versions of a signal 310, however, likely will be affected differently by fading and other effects. MIMO takes advantages of these differences, using various techniques to isolate and/or combine the multiple version of the signal 310 into a stable signal that may be of higher quality.

MIMO-based system implementations may employ channel state information (CSI) at the transmitter and/or receiver. Channel state information refers to known properties of a communication link. This information describes how a signal propagates from the transmitter to the receiver, and represents the combined effect of, for example, scattering, fading, and/or power decay with distance, among other possible effects. The CSI makes it possible to adapt transmissions to current channel conditions and assists in achieving reliable communication with high data rates in multi-antenna systems.

MIMO technology can be subdivided into three main categories: pre-coding, spatial multiplexing, and diversity coding.

Pre-coding describes all spatial processing that occurs at the transmitter, including beamforming. In beamforming, the same signal is transmitted from each of the transmit antennas with appropriate phase and gain weighting such that the signal power is increased at the receiver. In other words, the radio signal is "shaped" or "steered" in the direction of the receiver. Beamforming increases the received signal gain by making signals emitted from different antennas add up constructively, thus reducing multipath fading effects. When a receiver has multiple antennas, transmit beamforming may not be able to simultaneously improve the signal level at all of the receive antennas, so pre-coding with multiple streams may be beneficial. Pre-coding generally requires that the transmitter and receiver have the CSI about the signals between them.

In spatial multiplexing, a high-rate signal is split into multiple lower-rate streams and each stream is transmitted from a different transmit antenna in the same frequency channel. When these signals arrive at the receiver antenna array with sufficient different spatial signatures, and the receiver has accurate CSI, the receiver can separate the streams into nearly parallel channels. Spatial multiplexing may thus provide increased channel capacity at higher signal-to-noise ratios. The maximum number of spatial streams is limited by the lesser of the number of antennas at the transmitter or receiver. Spatial multiplexing can be used without CSI at the transmitter, but can be combined with pre-coding if CSI is available.

Diversity coding techniques can be used when the transmitter does not have CSI. In diversity coding, a single stream is transmitted, and the signal is coded using space-time coding techniques. The signal is emitted from each of the transmit antennas with full or near orthogonal coding. Each receive antenna thus receives divergent copies of the signal. Diversity coding exploits the independent fading in the multiple antenna links to enhance signal diversity. Because there is no channel knowledge, there is no beamforming or array gain from diversity coding. Diversity coding can be combined with spatial multiplexing when some channel knowledge is available to the transmitter.

III. Multi-User, Multiple-Input and Multiple-Output (MU-MIMO)

In a MIMO system, such as is discussed above, network device can still only communicate with a single client device at a time. Thus a more advanced version of MIMO, Multi-User MIMO (MU-MIMO) was developed. MU-MIMO builds on MIMO concepts to provide a transmitter the ability to communicate simultaneously with multiple receivers.

MU-MIMO applies an extended version of space-division multiple access (SDMA) to allow multiple transmitters to send separate signals and multiple receivers to receive separate signals simultaneously in the same band.

SDMA enables creating parallel spatial data signals through spatial multiplexing and/or diversity, SDMA relies on a multiple antenna array at the transmitter, and leverages the spatial location of the receivers. The transmitting antennas apply beamforming to the signals; that is, the antennas adapt the radiation pattern of the signal to obtain the highest gain in the direction of a specific receiver. This is often done using phased array techniques. The receiver also has multiple antennas, and applies additional filtering to the received signals to distinguish the spatially distributed signals.

Figure 4A:
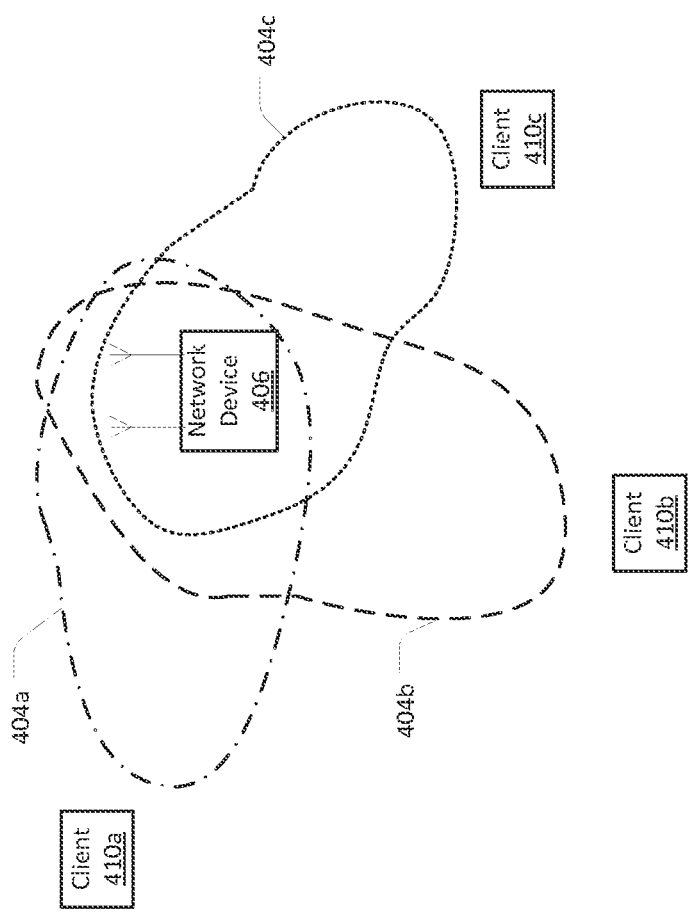
FIG. 4A provides an illustration of a transmitter, such as a network device that is capable of providing wireless connectivity to a network, that has multiple antennas.

FIG. 4A provides an illustration of a transmitter, such as a network device 406 that is capable of providing wireless connectivity to a network, that has multiple antennas. The network device 406 is configured to simultaneously transmit to multiple receivers, such as client devices 410a-c. Having multiple antennas allows the network device 406 to apply beamforming to a transmitted signal 404a-c. For example, for the client device 410a, the network device 406 may shape the transmitted signal 404a such that the signal is stronger in the direction of the client device 410a than in other directions. The network device 406 can also take advantage of the spatially diverse locations of the client devices 410a-c. Using spatial multiplexing, the network device 406 can simultaneously broadcast to all the client devices 410a-c. The client devices 410a-c, also have multiple antennas so that they can receive the beamformed signal. The client devices 410a-c may apply filtering to the incoming signals 404a-c to distinguish the signals 404a-c, and identify the signal 404a-c each client device 410a-c was meant to receive.

To implement MU-MIMO, the network device 406 may acquire CSI for each of the client devices 410a-c. The network device 406 may acquire CSI through a process generally called sounding. Sounding processes generally involve the network device 406 sending a known pattern of radio frequency symbols from each of its antennas. The client devices 410a-c receive the pattern and construct a matrix for how each of the receive antennas received the symbols from each transmit antenna. The client devices 410a-c transmit this information back to the network device 406, and the network device 406 uses the matrix to determine optimum amplitude-phase settings for each client device 410a-c.

Figure 4B:
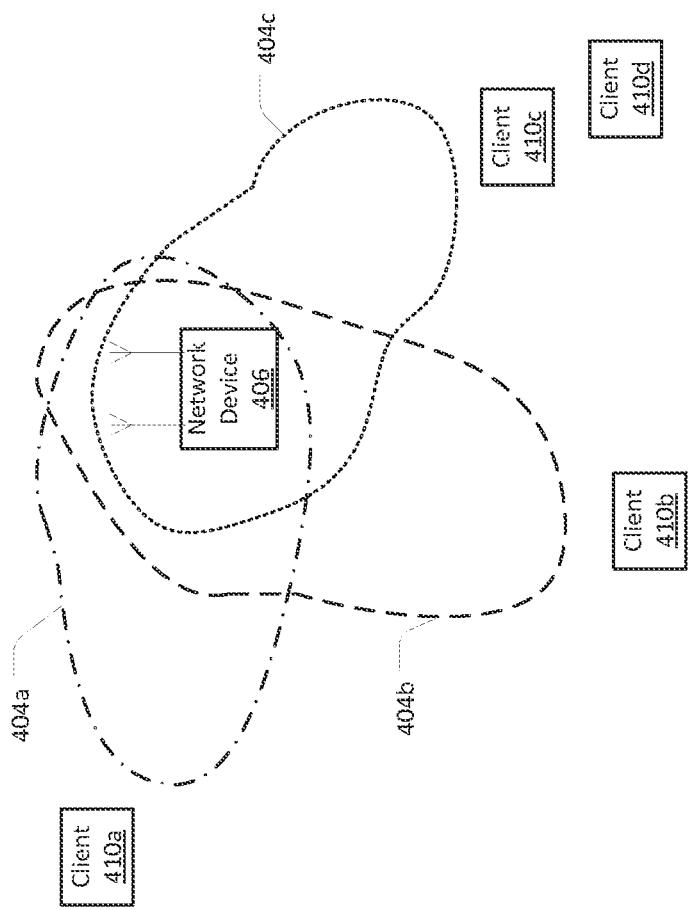
FIG. 4B illustrates one example where there is not sufficient spatial diversity between at least two client devices for MU-MIMO to be activated.

MU-MIMO cannot be applied in all situations, however. FIG. 4B illustrates one example where there is not sufficient spatial diversity between at least two client devices 410c-d for MU-MIMO to be activated. In the illustrated example of FIG. 4B, a client device 410d is too close to another client device 410c for the network device 406 to generate a beamformed signal to both client devices 410c-d. Because MU-MIMO employs all of the antennas at the network device 406, in order to service the associated client devices 410a-d in this example, the network device 406 would have to disable MU-MIMO and use non-MU-MIMO techniques to serve all the client devices 410a-d. For example, the network device 406 may take turns, first transmitting a beamformed signal to the group of client devices 410a-c that can receive MU-MIMO transmissions, then transmitting a non-beamformed transmission to the client device 410d that cannot be in the group. Alternatively, the inconveniently placed client device 410d can be associated with another nearby network device, thus providing the illustrated network device 406 with a good scenario for activating MU-MIMO.

IV. Traffic Flows

Figure 5:
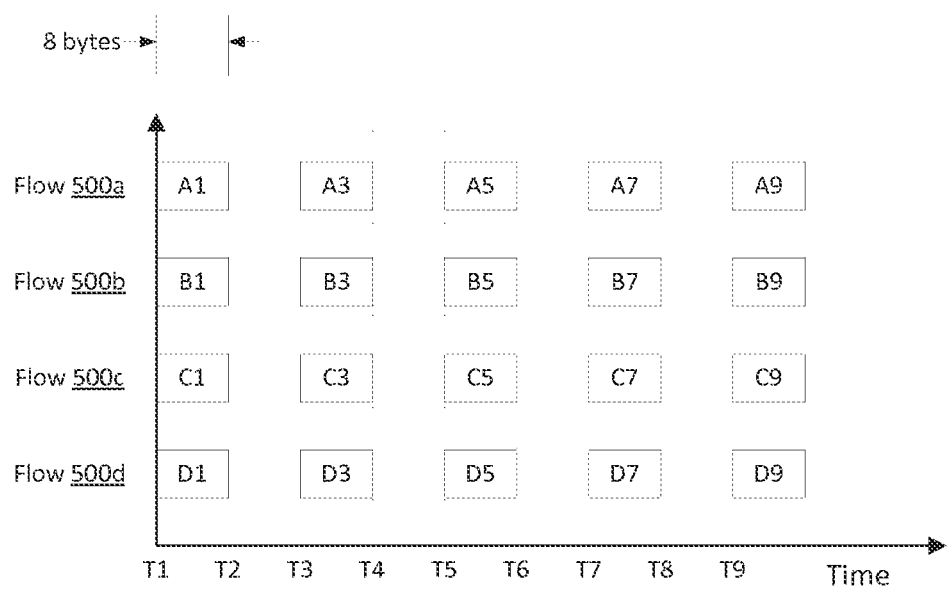
FIG. 5 illustrates on a graph one example of four traffic flows with similar traffic characteristics that may be transmitted to four different client devices.

Other factors affect the practicality of activating MU-MIMO at a network device that provides wireless network connectivity. One of those factors is the characteristics of the frames being transmitted through a network device to the client devices associated with that network device. FIG. 5 illustrates on a graph one example of four traffic flows 500a-d that may be transmitted to four different client devices. A traffic flow as discussed here is the flow of data to a client device. A flow of data may comprise audio, video, graphics, text, webpages, any combination of these data types, or some other data type. A traffic flow may include a single frame of data, multiple frames of data that together make up a single set of data, multiple frames of data for different sets of data, and/or a continuous stream of frames (also called streaming data) composed of a large number or undefined number of frames.

Each traffic flow 500a-d has at least two characteristics: a frame size and an inter-arrival time. The frame size is the number of bits or bytes in the frame. In the example of FIG. 5, the frames for the traffic flow 500a are each eight bytes in size. In this example, eight bytes can be transmitted within one time slot (e.g., from time T1 to time T2). Inter-arrival time describes how frequently the frames of a traffic flow arrive at the network device. In the example of FIG. 5, the frames for the traffic flow 500a arrive at every other time slot, starting at time T1 (e.g., at time T1, T3, T5, etc.).

In some implementations, MU-MIMO may be more effective when the traffic flows to a group of client devices that have similar traffic characteristics. As discussed above, MU-MIMO involves transmitting to multiple receivers at the same time. Instead of transmitting one frame to one client device, multiple frames for multiple client devices may be multiplexed together and transmitted in the same time and space of one frame. In this way, the rate of data, or data rate, to the client devices may be increased from one frame per time slot to multiple frames per time slot. The amount of data transmitted, however, essentially remains the same, one frame. Thus, in most cases MU-MIMO may be more efficient when the frames transmitted to the group of client devices are similarly in size. As will be discussed in further detail below, MU-MIMO may also be more efficient when the frames have similar inter-arrival times.

FIG. 5 illustrates an example where all the traffic flows 500a-d have similar traffic characteristics. Specifically, the traffic flows 500b-d have characteristics that are similar to the characteristics of the traffic flow 500a. That is, each traffic flow 500a-d has frames that are about eight bytes in size. Furthermore, for each traffic flow 500a-d, the frames arrive in every other time slot, starting at time T1. Thus at time T1, frames A1, B1, C1, and D1 have arrived at the network device. The frames A1, B1, C1, and D1 may be multiplexed, and transmitted with a beamformed transmission to the client devices. At time T2, no data has arrived for any traffic flow 500a-d, and thus in this time slot the network device may remain idle or handle other transmissions. At time T3, a frame has arrived for each of the traffic flows again, and the network device may again transmit to all of the client devices.

MU-MIMO can operate even when the packet traffic characteristics for a group of client devices is not similar. When traffic flows have dissimilar characteristics, however, MU-MIMO may not achieve the same data rate increase possible when the traffic flows have similar characteristics. In some cases, MU-MIMO may result in a decrease in the possible data rate.

Figure 6A:
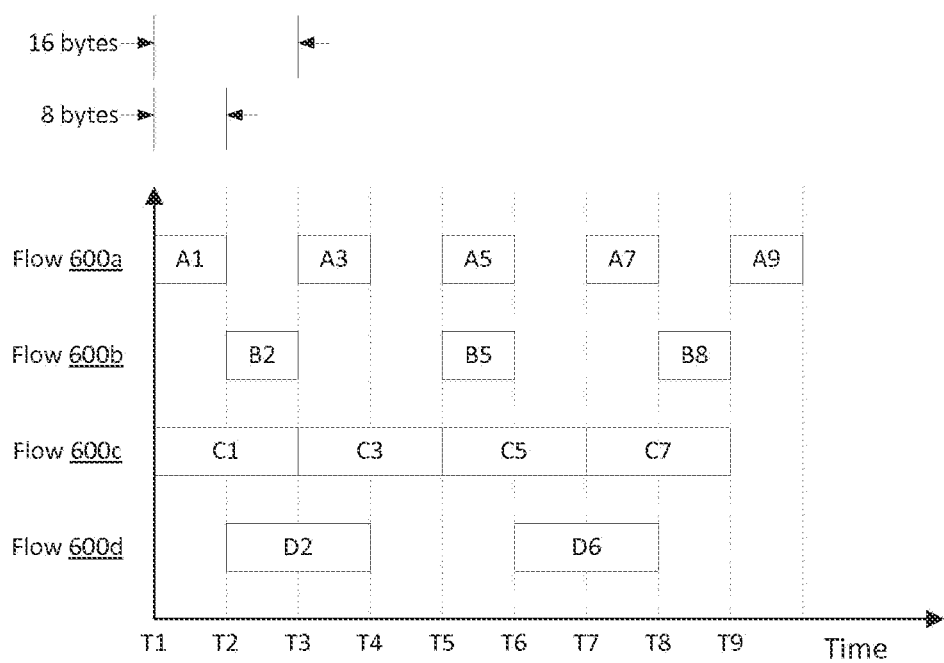
FIG. 6A illustrates an example of traffic flows with dissimilar traffic characteristics.

An example of traffic flows with dissimilar traffic characteristics are illustrated in FIG. 6A-6G. In the example of FIG. 6A, the traffic flow 600a has a frame size that is about eight bytes. The inter-arrival time for the frames for the traffic flow 600a is every other time slot, starting at time T1 (e.g., frames arrive at T1, T3, T5, etc.). The traffic flow 600b also has frames that are eight bytes in size, but the inter-arrival time of these frames is ever third time slot, starting at time T2 (e.g., at T2, T5, T8, etc.). The traffic flow 600c has frames that are sixteen bytes in size. In this example, sixteen-byte frames require twice as much time—or two timeslots—to arrive as do eight-byte frames. The inter-arrival time for the frames for the traffic flow 600c is every other timeslot, starting at time T1 (e.g., at T1, T3, T5, etc.). The traffic flow 600d also has frames that are sixteen bytes in size. The frames for the traffic flow 600d, however, arrive every fourth timeslot, starting at time T2 (e.g., at T2, T6, etc.).

FIGS. 6B-6G illustrate an example of the transmission, over time, of the traffic flows illustrated in FIG. 6A by a network device that has enabled MU-MIMO. As will be explained in further detail below, a group of traffic flows such as is illustrated in FIG. 6A may not be well-suited for MU-MIMO transmissions. FIGS. 6B-6G each illustrate the frames that have arrived at the network device at the end of a particular time slot. FIGS. 6B-6G also illustrate an example of a data buffer 602. A network device that is receiving the traffic flows 600a-d may have a data buffer 602 to temporarily store frames prior to transmitting those frames to associated client devices. The example of FIGS. 6B-6G illustrate the first two buffer entries 602a-b. The buffer 602 may have more entries than are illustrated here. The first buffer entry 602a reflects the least recent frames received by the network device, and the frames that should be transmitted soonest. Each buffer entry includes a space for frames from each of the traffic flows 600a-d.

Figure 6B:
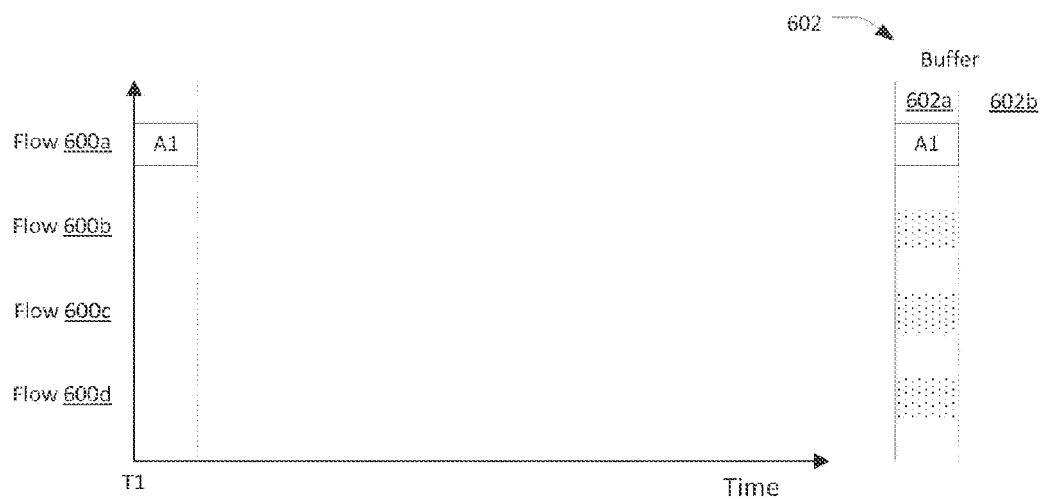
FIGS. 6B-6G illustrate an example of the transmission, over time, of the traffic flows illustrated in FIG. 6A by a network device that has enabled MU-MIMO.

FIG. 6B illustrates the frames that have arrived at the network device during time slot T1. At time T1 frame A1 for traffic flow 600a has arrived at the network device. No frames have arrived yet for any of the other traffic flows 600b-d. As noted above, an MU-MIMO-enabled network device intends to transmit to all client devices in a group at the same time. At time T1, transmitting only to the client device that is to receive the traffic flow 600a would not be an MU-MIMO transmission. Rather than abandon MU-MIMO, the network device may instead put the frame A1 in the first buffer entry 602a, and wait for additional data to arrive.

Figure 6C:
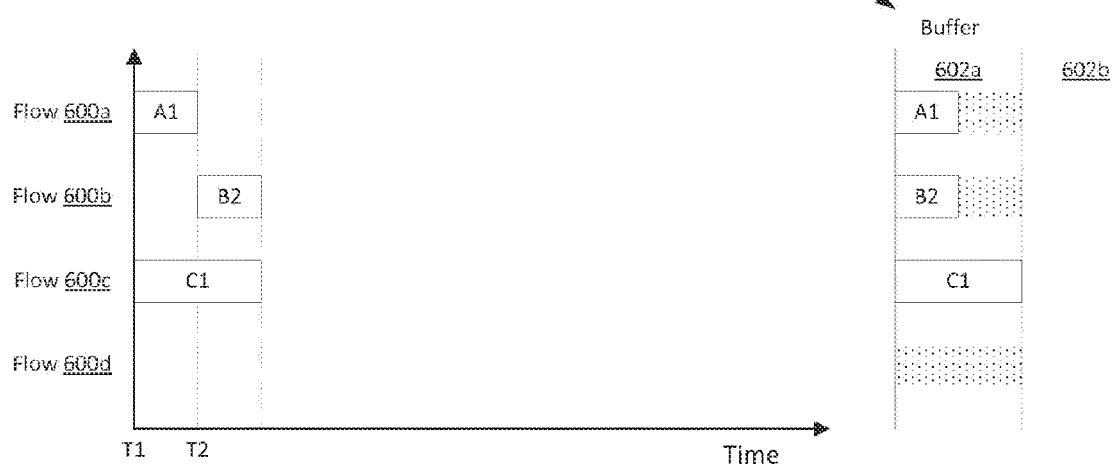

FIG. 6C illustrates the frames that have arrived at the network device during time slot T2. At time T2, the network device has received frame 132 for the traffic flow 600b and frame C for the traffic flow 600c. No frames have yet arrived for the traffic flow 600d. Without any data for the traffic flow 600d an MU-MIMO transmission may not yet be possible, because all the client devices will be transmitted to at the same time. The network device may thus place the frames C1 and B2 in the first buffer entry 602a and continue to wait for more data to arrive.

Figure 6D:
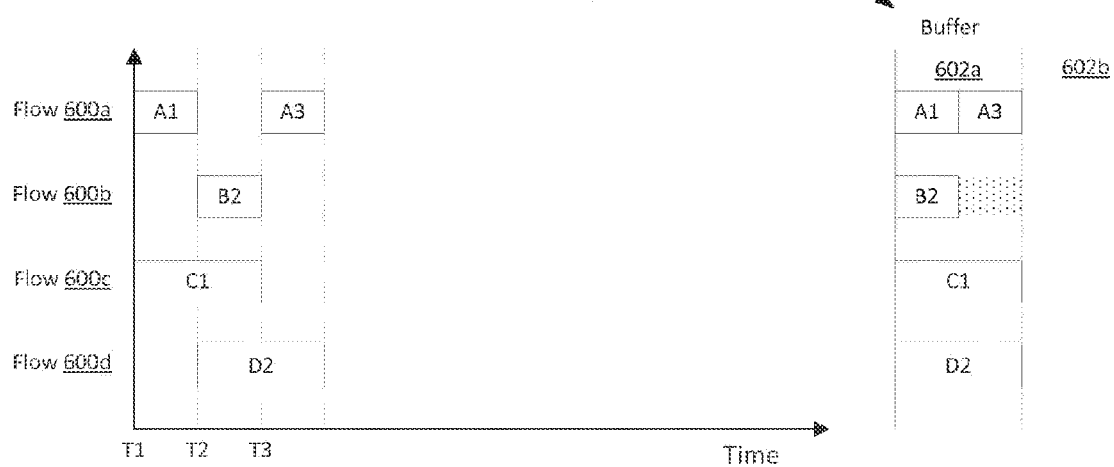

FIG. 6D illustrates the frames that have arrived at the network device during time slot T3. At time T3, the network device has received a second frame A3 for the traffic flow 600a, as well as the first frame D2 for traffic flow 600d. At time T3, another possible obstacle to an MU-MIMO transmission becomes evident. The frames C1 and D2 are both sixteen bytes in size. The first buffer entry 602a has two frames, A1 and A3, for the traffic flow 600a, which together constitute sixteen bytes. But the first buffer entry 602a has only one frame, B2, for the traffic flow 600b, which amounts to only eight bytes. An MU-MIMO transmission at this time may cause the eight bytes of frame B2 to be transmitted to the client device associated with the traffic flow 600b, as well as eight bytes of unknown, random, or otherwise invalid data. Some client devices may not know how to handle invalid data. Thus to avoid transmitting invalid data, the network device may add the frames A3 and D2 to the first buffer entry 602a, and continue to wait for additional data for the traffic flow 600b. In some implementations, the network device may pad eight bytes to the frame B2 so that sixteen bytes are available for transmitting. While padding may avoid transmitting invalid data, the padding may not be useful data, and thus may be a waste of transmission time.

Figure 6E:
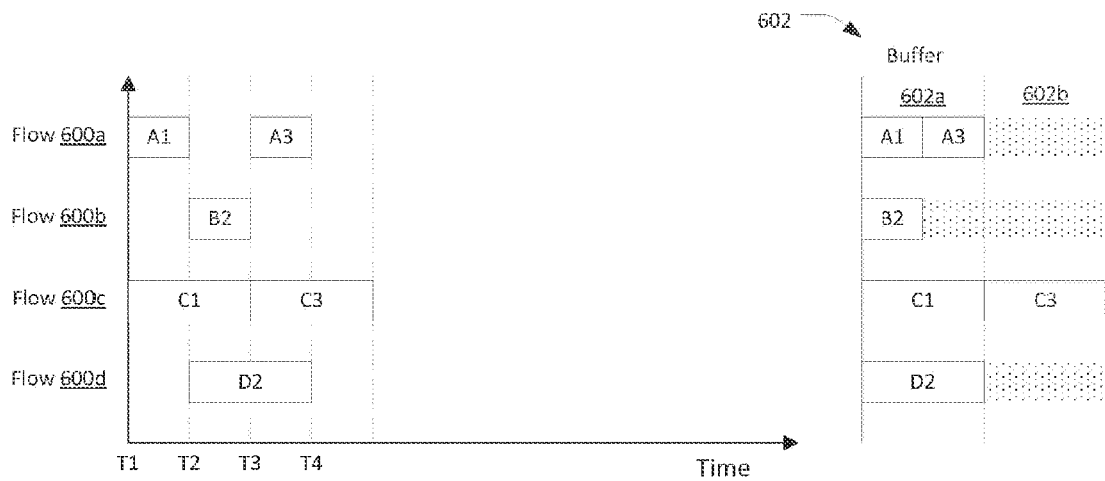

FIG. 6E illustrates the frames that have arrived at the network device during time slot T4. At time T5, another frame C3 has arrived for the traffic flow 600c. Because the previous frame C1 for the traffic flow 600c has not yet been transmitted, the frame C3 is placed in the second buffer entry 602b. No frames have arrived for the traffic flow 600b, however, and so the network device is not yet ready for a MU-MIMO transmission.

Figure 6F:
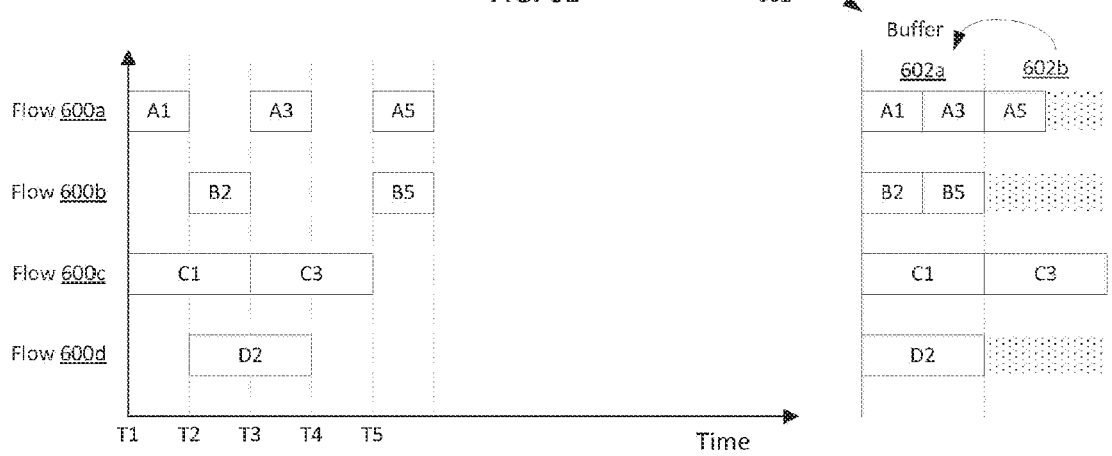

FIG. 6F illustrates the frames that have arrived at the network device during time slot T5. At time T5, frame A5 has arrived for the traffic flow 600a, and frame B5 has arrived for the traffic flow 600b. The frame A5 may be placed in the second buffer entry 602b while the network device handles the data in the first buffer entry 602a. The first buffer entry 602a now contains an equal amount of data for each of the traffic flows 600a-d. The network device may now transmit to all the client devices associated with the traffic flows 600a-d. The same amount of data will be transmitted to each of the client devices in a single, beam-formed signal. Once the frames A1, A3, B2, B5, C1, and D2 have been transmitted and removed from the first buffer entry 602a, any contents in the second buffer entry 602b may be moved ahead to the first buffer entry 602a.

Figure 6G:
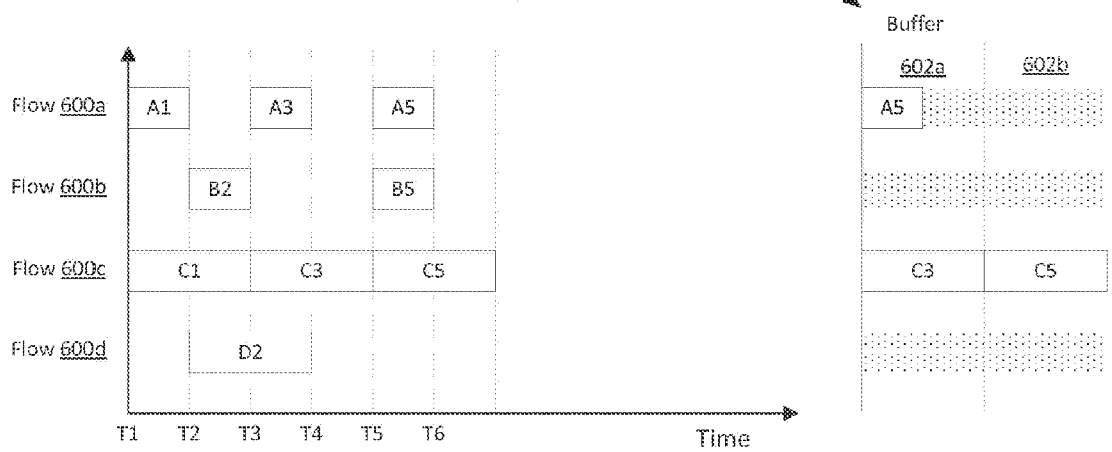

FIG. 6G illustrates the frames that have arrived at the network device during time slot T6. At time T6, the frame C5 has arrived for the traffic flow 600c. The frame C3 now occupies the first buffer entry 602a, so the frame C5 may be placed in the second buffer entry 602b. The frame A5 also occupies the first buffer entry 602a, but the frame A5 is only half the size of the frame C3. Furthermore, the first buffer entry 602a does not have any data for the traffic flows 600b, 600d. Thus at this time, the network device is not able to transmit to all the client devices at the same time.

The example illustrated in FIGS. 6B-6G demonstrates that traffic flows with different frame sizes and inter-arrival times may not be suited for transmission using MU-MIMO. Frames to some client devices may be delayed until the network device has enough data to transmit to all the client devices in the group. This delay may cause the client devices to suffer noticeable interruptions or excessive delays in the presentation of the data to a user. Grouping traffic flows with similar frame sizes and inter-arrival times at the same network device may lead to a more effective usage of MU-MIMO.

Other packet traffic characteristics may also or instead be considered to encourage usage of MU-MIMO. For example, access categories may also be considered. In some aspects, access categories define a priority for traffic flows that may be included within the access category. Traffic flows assigned to a higher priority access category may be allowed to send more frames more frequently than a lower priority access category. A contention window can also be set according to the traffic expected in each access category. For example, a wider contention window can be set for categories with larger amounts of traffic, such as video. Grouping traffic flows by their access category may also encourage usage of MU-MIMO by a network device at which the traffic flows are grouped. Traffic flows with the same access category may have similar contention windows, thus the flow of packets for these traffic flows may be similar as well.

V. Grouping Client Devices Across Basic Service Sets (BSS)

As discussed above, MU-MIMO provides a mechanism by which an access point can transmit to a group of client devices at the same time. MU-MIMO may be more effective when frames to the client devices in the group have similar traffic characteristics. When the frames to the client devices have similar traffic characteristics, the likelihood that overall throughput to the grouped client devices will improve is greater. In some cases, channel state information (CSI) also assists in forming groups of client devices, because CSI may indicate to an access point where a client device may be located. The locations of client devices informs the access point how to beamform transmitted signals to the client devices. CSI may also inform the access point of the condition of a link between the access point and an individual client device, which may also inform the access point how to beamform the signal to the client device.

Figure 7A:
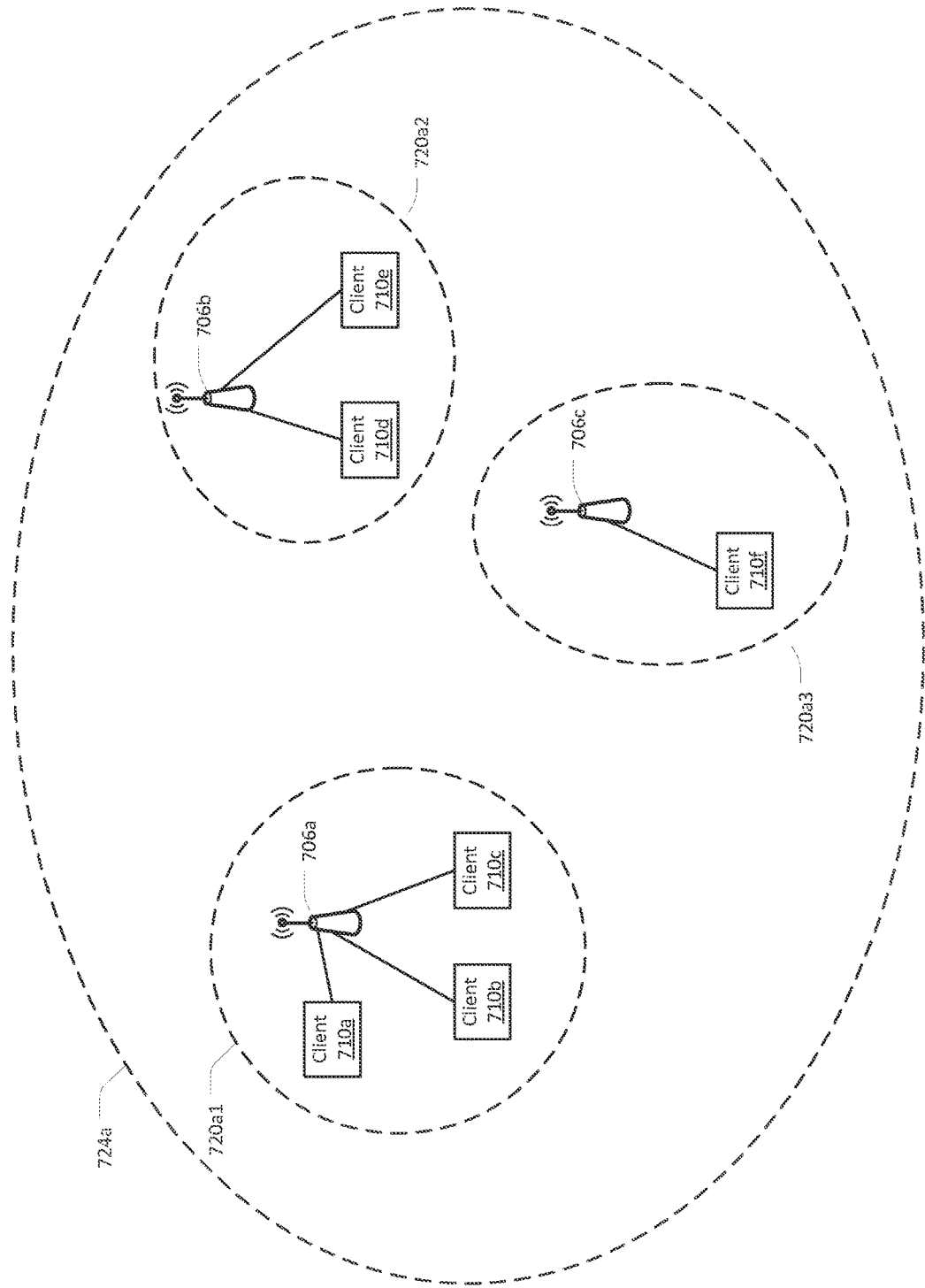
FIG. 7A illustrates and example of the BSS for three access points that are associated with the same wireless local area network.

An apparent limitation of MU-MIMO is that an MU-MIMO enabled network device may only group client devices that are within the same basic service set (BSS). BSS describes a network device that provides wireless network access (such as an access point) and any client devices associated with that network device. FIG. 7A illustrates and example of the BSS 720a1-3 for three access points 706a-c. In this example, the three access points 706a-c are associated with the same wireless local area network (WLAN). A first access point 706a is associated with three client devices 710a-c. Together, this access point 706a and its associated client devices 710a-c form a first BSS 720a1. A second access point 706b is associated with two client devices 710d-e. This access point 706b and its two associated client devices 710d-e form a second BSS 720a2. A third access point 706c is associated with one client device 710f, which together form a third BSS 720a3.

A BSS 720a1-3 may be identified by a basic service set identifier (BSSID). A BSSID may be a human-readable string of characters, such as "employee_network", or may be some other identifier. In some cases, each BSS 720a1-3 has a unique identifier. For example, in some cases, the BSSID for a BSS 720a1-3 may be the Media Access Control (MAC) address of the access point 706a-c.

A BSS 720a1-3 may also be identified by a service set identifier (SSID). An SSID may be the identifier for the WLAN. Client devices that want to connect to any of the access points 706a-c may identify the WLAN using the SSID. The SSID for this example may be, for example, "employee network," and may be provided for all employees of an office. An SSID may also be referred to as a network identity.

In this example, the BSS 720a1-3 may be identified by the same SSID. The BSS 720a1-3 may therefore be within the same extended service set (ESS) 724a. An extended service set describes two or more interconnected BSS. BSS within the extended service set may share common functions and controls, such as security credentials, encryption, access controls, and so on. The extended service set 724a may generally be identified by the SSID of the WLAN. The extended service set's 724a identifier may also be referred to as an extended service set identifier (ESSID).

In a network configuration such as is illustrated in FIG. 7A, client devices 710a-f may associate with any of the access point 706a-c using the SSID and authentication information provided for the extended service set 724a. The client devices 710a-f may also "roam" (e.g., disassociate from one access point 706a and associate with another access point 706b) from one access point 706a-c to another without needing to re-authenticate. The network, however, needs to keep track of which client devices 710a-f are associated with which access points 706a-c so that data may be properly directed to each client device 710a-f For example, if the client device 710a was once associated with the access point 706b, but has since roamed to the access point 706a, the network should not continue to send data for the client device 710a to the access point 706b. The network may use BSS 720a1-3 to keep track of which client devices 710a-f are associated with which access points 706a-c at any given time. For example, in the illustrated example, the client devices 710a-c are in the BSS 720a1, the client devices 710d-e are in the BSS 720a2, and the client device 710f is in the BSS 720a3.

A network configuration, however, may include more than one extended service set. FIG. 7B illustrates an example of a network configuration that includes two, overlapping extended service sets 724a-b. In the example of FIG. 7B, a second extended service set 724b, with a second SSID, has been defined for the same access points 706a-c that are within the extended service set 724a illustrated in FIG. 7A. A network configuration may provide a second extended service set 724b using the same access points for various reasons. For example, the second 724b of FIG. 7B may, for example, have an SSID "guest_network," and may be provided for visitors to the office. The second extended service set 724b may have lower authentication requirements than the extended service set 724a with the SSID of "employee_network" but may also have lower access privileges.

In this example, client devices 710g-k that associate with the "guest_network" extended service set 724b are associating with the same access points 706a-c that provide the "employee network" extended service set 724a. Consequently, the access points 706a-c each have a second BSS 720b1-3. For example, the access point 706a, which already forms a BSS 720a1 with the client devices 710a-c, may also form a BSS 720b1 with the client devices 710g-h. In this example, the client devices 710a-c associate with the access point 706a using the SSID "employee_network," while the client devices 710g-h associate with the access point 706a using the SSID "guest_network." Similarly, the access point 706b forms a first BSS 720a2 with the client devices 710d-e, and forms a second BSS 720b2 with the client device 710i. The client devices 710d-e associate with the access point 706h using the SSD "employee_network" while the client device 710i associates with the access point 706b using the SSID "guest_network." Also similarly, the access point 706c forms a first BSS 720a3 with the client device 710f and a second BSS 720b3 with the client devices 710j-k.

MU-MIMO as presently defined does not address transmitters (e.g. access points) that are able to form more than one BSS. Consequently, the standard does not provide a mechanism for grouping client devices that are in different BSS. Client devices in different BSS, however, may be well suited for forming a group for MU-MIMO transmissions. The client devices may have similar traffic characteristics, and may be well-positioned for beamforming. Grouping client devices, and transmitting to the group using MU-MIMO transmissions, may increase the throughput to at least those client devices.

Figure 8:
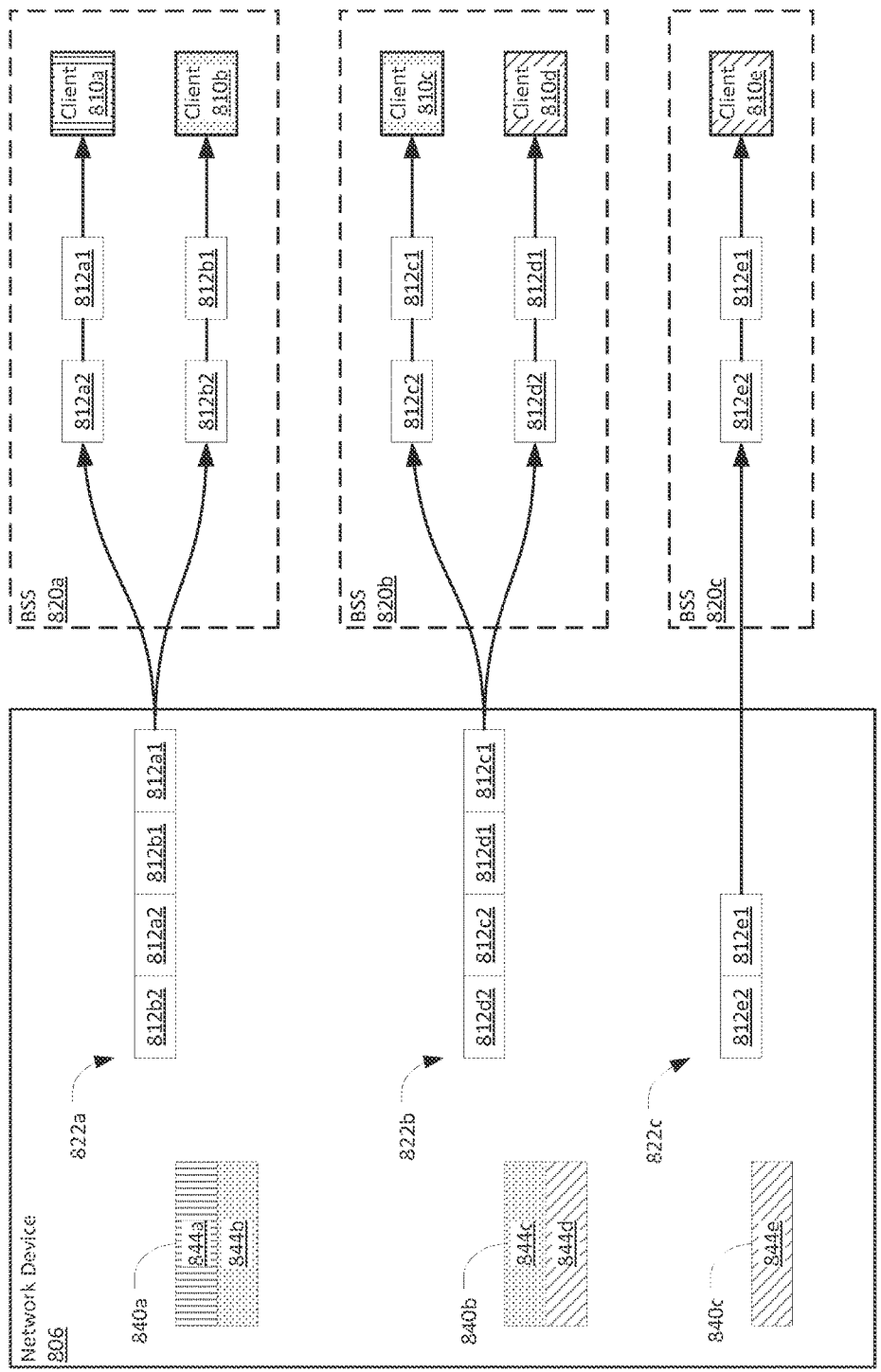
FIG. 8 illustrates an example of a network device configured with three BSS.

FIG. 8 illustrates an example of a network device 806 configured with three BSS 820a-c. As will be explained in further detail below, in this example several client devices are suitable for grouping for MU-MIMO transmissions. Applying only the MU-MIMO as presently understood, however, these client devices may not be grouped because the client devices are in different BSS.

In the example illustrated by FIG. 8, the network device 806 is providing wireless network services to five associated client devices 810a-e. The client devices 810a-b together with the network device 806 form a first BSS 820a. The client devices 810c-d together with the network device 806 form a second BSS 820b. The client device 810e together with the network device 806 forms a third BSS 802c. In some implementations, the network device 806 may handle having three BSS 820a-c by internally acting as if it is three network devices. In these implementations, the network device 806 may maintain separate queues for frames that are destined for each BSS 820a-c. For MU-MIMO purposes, the network device 806 may also maintain separate feedback tables 840a-c for each BSS 820a-c. As explained in further detail below, the feedback tables 840a-c store the results from collecting feedback 844a-e from the client devices 810a-e. This feedback 844a-e may be collected using a sounding process. The network device 806 may use the feedback data 844a-e to determine how to group two or more client devices for receiving MU-MIMO transmissions. The feedback data 844a-e may also inform the network device 806 how to shape a beamformed signal to a group of client devices.

As discussed above, MU-MIMO involves transmitting to more than one client device at the same time. When the network device 806 enables MU-MIMO, the network device 806 may attempt to identify which client devices 810a-e can form one or more groups for purposes of receiving MU-MIMO transmissions. In the example of FIG. 8, however, each BSS 820a-c may be treated independently. The network device 806 may thus examine each BSS's 820a-c queue 822a-c and feedback table 840a-c independently. For example, in examining the queue 822a for the BSS 820a, the network device 806 may determine that the frames 812a1-2 for the client device 810a include, for example, webpage data. The network device 806 may further determine that the frames 812b1-2 for the client device 810b include streaming video data. The traffic characteristics for webpage data and for streaming video data may be different, and so the client devices 810a-b may not be suitable for forming a group for receiving MU-MIMO transmissions. In examining the queue 822b for the BSS 820b, the network device 806 may note that the frames 812c1-2 for the client device 810c include streaming video data, while the frames 812d1-2 for the client device 810d include voice data. The traffic characteristics for streaming video data and voice data may also not be sufficiently similar for the client devices 810c-d to form a group for receiving MU-MIMO transmissions.

It is evident, however, that the client devices 810b and 810c have similar traffic types, and that the frames 812b1-2 and 812c1-2 may have similar traffic characteristics. The network device 806, however, may be treating each BSS 820a-c independently. The network device 806 may thus consider each feedback table 840a-c independently. The network device 806 may examine the feedback table 840a and find no client devices that can be grouped. The network device 806 may also examine the feedback table 840b and also find no client devices that can be grouped.

To continue the example of FIG. 8, the network device 806 may examine the queue 822c for the third BSS 820c and find that the frames 812e1-2 for the client device 810e include voice data. The client device 810e, however, may not be grouped with any other client devices because it is alone in its BSS 820c, and the network device 806 may be trek each BSS independently.

In the example illustrated by FIG. 8, no client devices can be grouped for MU-MIMO transmissions, and thus MU-MIMO may not be activated. In such cases, the network device 806 may be left to transmit frames to each client device one at a time. For example, the network device 806 may transmit a frame 812a1 first to the client device 810a, then a frame 812b1 to the client device 810b, then a frame 812c1 to the client device 810c, and then sequentially frames 812d1, 812e1 to their respective client device 810d-e. In such cases, opportunities to group client devices for receiving MU-MIMO transmissions, and possibly improve the throughput to at least some of the client devices, may be overlooked.

To determine which client devices can be grouped, a network device may acquire sounding information from the client devices. As discussed above, sounding information indicates to the network device the state of the channel between the network device and an individual client device. Sounding information (also referred to herein as feedback data) may indicate, for example, the relative angles between the network device's transmitting antennas and the client device's receiving antennas. These angles may indicate to the network device how to shape or beamform the signal being transmitted to the client device. Sounding information may also provide information about the state of the channel between the network device and the client device, including information about, for example, signal scattering, interference, power decay, etc.

Figure 9:
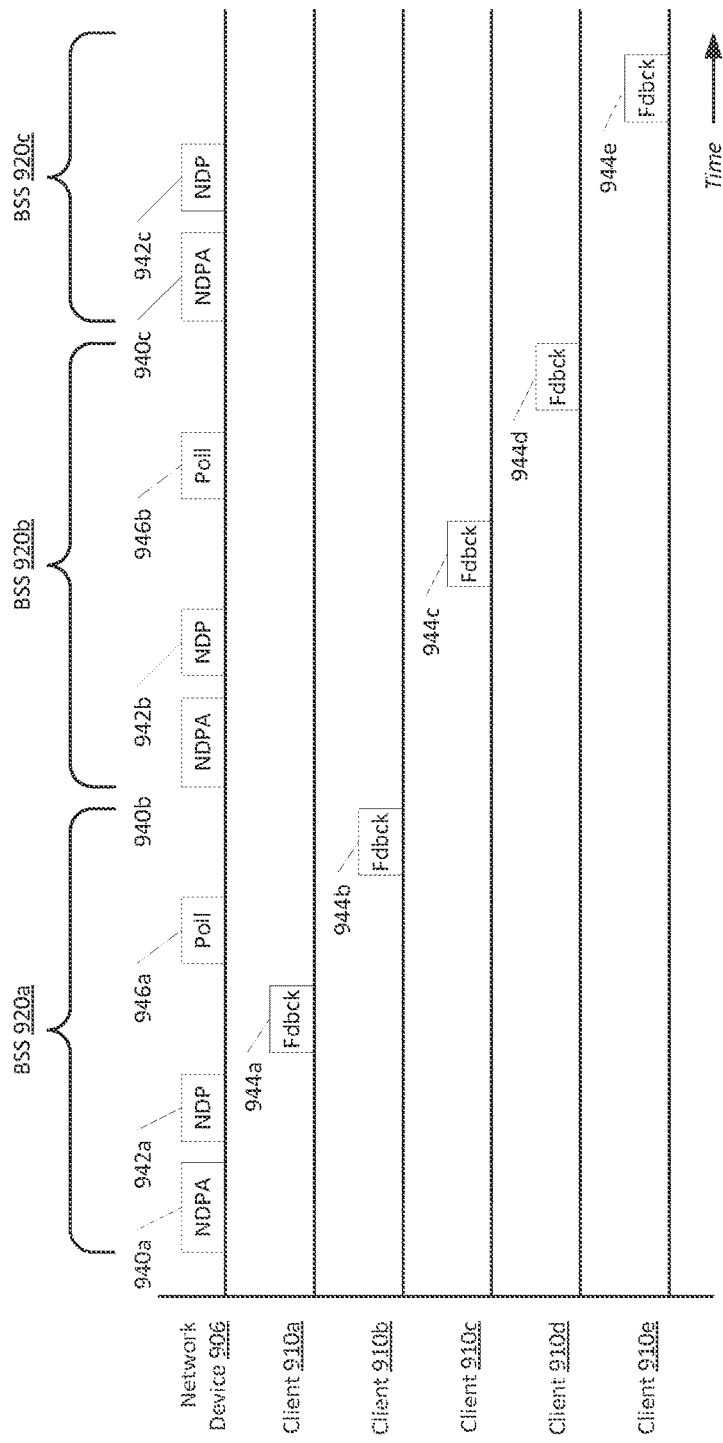
FIG. 9 illustrates an example of one implementation of a sounding process.

FIG. 9 illustrates an example of one implementation of a sounding process. The illustrated process may be used by a network device 906 that is treating each of its BSS 920a-c individually. The same process can also be used when the network device 906 is configured to group client devices across BSS 920a-c, as discussed in further detail below. The example of FIG. 9 assumes a similar network device 906, client devices 910a-e and BSS 920a-c configurations as are illustrated in FIG. 8. Specifically, in the example of FIG. 9, a network device 906 is associated with five client devices 910a-e. The client devices 910a-b are in the BSS 920a, the client devices 910c-d are in the BSS 920b, and the client device 910e is in the BSS 920c.

In the example of FIG. 9, the network device 906 begins the example sounding process by sounding the first BSS 920a. Sounding the first BSS 920a involves first transmitting a Null Data Packet Announcement (NDPA) frame 940a to the client devices 910a-b in the BSS 920a. The NDPA frame 940a informs the client devices 910a-b that the sounding process is beginning. The NDPA frame 940a may also provide other information, such as the number of transmit antennas that are available for beamforming the transmitted signal, and/or whether there are multiple clients in the BSS 920a being sounded, or only one.

The network device 906 may next transmit a Null Data Packet (NDP) frame 942a. In some cases, the NDP frame 942a is called a Null Data Packet frame because it contains only a header field, and no data. The NDP frame 942a may contain training symbols, for instance, in the header field.

Training symbols may be patterns of data that the client devices 910a-b are expected to receive in a certain way. The client devices 910a-b in the BSS 920a may indicate how the training symbols were actually received responding with feedback frames 944a-b. The feedback frames 944a-b indicate to the network device 906 how the training symbols were received by each client device 910a-b. In some cases, because the BSS 920a includes more than one client device 910a-b, the network device 906 may transmit a polling frame 946a after receiving the first feedback frame 944a. The network device 906 may use the polling frame 946a to check whether it has received feedback frames 944a-b from all of the client devices 910a-b in the BSS 920a. Upon receiving the last feedback frame 944b, the network device 906 need not send another polling frame.

The network device 906 next may execute the same process for the second BSS 920b. The network device 906 may begin by transmitting a NDPA frame 940b to the client devices 910c-d in the second BSS 920b, to announce that sounding is starting. The network device 906 may next transmit an NDP frame 942b, that may include training symbols. Each client device 910c-d may respond with a feedback frame 944c-d, indicating how the training symbols were received. In some cases, the network device 906 may send a polling frame 946b after receiving the first feedback frame 944c, to check whether it has received feedback frames 944c-d from all of the client devices 910c-d in the BSS 920b.

The network device 906 may next sound the third BSS 920c, which has only one client device 910e. The network device 906 may begin by transmitting an NDPA frame 940c to the client device 910e. The network device 906 may next transmit an NDP frame 942c that may include training symbols. The client device 910e may respond with a feedback frame 944e. In this case, the BSS 920c only includes one client device 910e, so the network device 906 may not need to transmit any polling frames.

The network device 906 may individually sound each BSS 920a-c because frames, such as NDPA and NDP frames, can only be addressed to one BSS at a time. Consistent with treating BSS's independently, this means that each BSS 920a-c can be sounded at any convenient time. The feedback data may also be stored in individual feedback tables for each BSS 920a-c, as is illustrated in FIG. 8.

The steps illustrated by FIG. 9, however, can also be used to compile feedback data to group client devices that are associated with different BSS. In some implementations, a sounding process such as is illustrated in FIG. 9 can be used, with changes that use functionality that already exists within the sounding processes. In these implementations, when sounding a BSS with only one client device (such as the BSS 920c) the network device 906 may transmit multi-client sounding frames, instead of single-client sounding frames. The network device 906 may use multi-client sounding frames when a BSS includes more than one client device. A multi-client sounding frame indicates to the client devices that there may be multiple client devices for receiving beamformed signals, and allows the client devices to adjust their feedback data accordingly. An example of a multi-client sounding frame is an NDPA frame that has a multi-user flag enabled. A single-client sounding frame indicates to a client device that it may be the only recipient for a beamformed signal, and allows the client device to provide feedback data only related to itself. When grouping client devices in multiple BSS, all client devices, regardless of whether they are alone in their BSS, may potentially be grouped with other client devices and receive beamformed signals. Hence, when sounding a BSS that includes only one client device, the network device 906 may transmit a multi-client sounding frame so that the lone client device provides feedback that takes into account the presence of other client devices.

In some implementations, the sounding process of FIG. 9 can also be modified in the timing of the collection of the feedback data. When not grouping client devices between different BSS, the network device 906 may execute the sounding process on each BSS 920a-c independently and at any convenient time. When the network device 906 is configured to group client devices across BSS, the network device 906 may be configured to execute the sounding process on each BSS 920a-c back-to-back. This is so that the feedback data for all the client devices 910a-e can be collected, and a feedback table be constructed, in a short span of time. The network device 906 may form groups of client devices based on the content of the feedback table, and thus has a greater selection when feedback from as many client devices as possible has been gathered.

Before proceeding, it should be noted that client devices that are not MU-MIMO capable may not respond to sounding frames. Client devices that are not MU-MIMO capable may not, for example, have multiple receiving antennas, or may not otherwise be capable of receiving and/or decoding beamformed signals. When these client devices do not provide feedback, the client device may not be included in considering groupings of client devices for receiving MU-MIMO transmissions. These client devices instead receive individually transmitted frames, as occurs when MU-MIMO is not enabled.

It should also be noted that the sounding process illustrated in FIG. 9 is only an example of a process for sounding. Other processes for collecting channel information from client devices may also be possible.

Figure 10A:
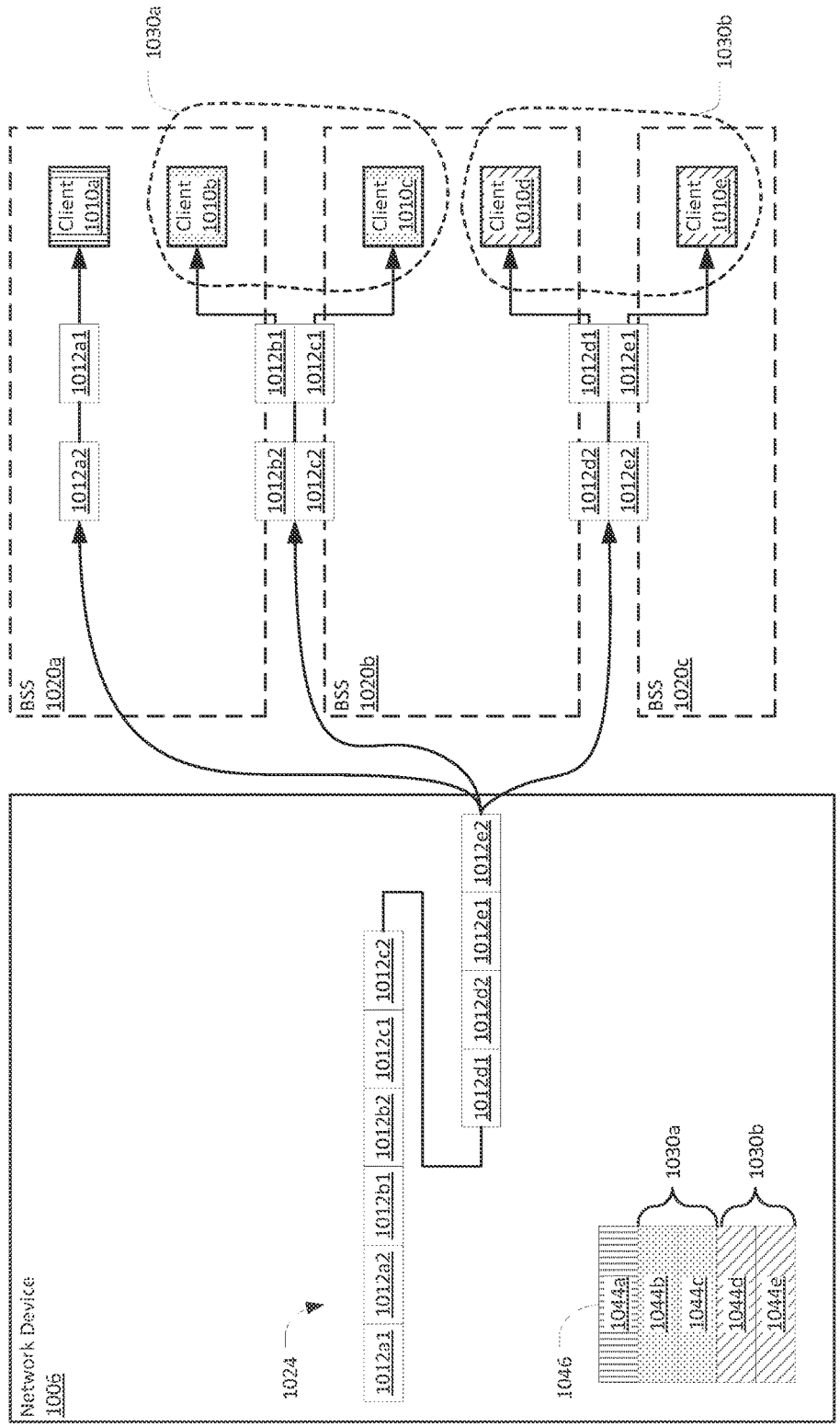
FIG. 10A illustrates an example of a network device configured to group client devices across BSS.

FIG. 10A illustrates an example of a network device 1006 configured to group client devices across BSS 1020a-c. In the illustrated example, the network device 1006 is associated with five client devices 1010a-e, organized into three BSS 1020a-c. The client devices 1010a-b and the network device 1006 form the first BSS 1020a. The client devices 1010c-d and the network device 1006 form the second BSS 1020b. The client device 1010e and the network device 1006 forms the third BSS 1020c.

In this example, the network device 1006 may be configured with a single queue 1024. The network device 1006 may use the single queue 1024 to queue frames for all the client devices 1010a-e. The network device 1006 may be configured with only one queue 1024 because the network device 1006 need not treat the BSS 920a-c individually. In some cases, a single queue 1024 is simple to implement and easy to maintain. Furthermore, the network device 1006 may be considering the traffic characteristics of all the client devices 1010a-e at the same time. This may be simplified by having all frames in a single queue 1024. In examining the traffic characteristics of all the client devices 1010a-e, the network device 1006 may determine that the client devices 1010b-c may have frames 1012b1-2, 1012c1-2 that have similar traffic characteristics (e.g., both client devices 1010b-c are receiving streaming video data). The network device 1006 may group these client devices 1010b-c in a group 1030a for receiving MU-MIMO transmissions. The network device 1006 may also determine that the client devices 1010d-e have frames 1012d1-2, 1012e1-2 with similar traffic characteristics (e.g., both client devices 1010*d-e* are receiving voice data), and group these client devices in another group 1030*b*.

The network device 1006 in this example also has a single feedback table 1046. Sounding information 1044*a-e* for all the client devices 1010*a-e* may be stored in one feedback table 1046. When considering how to group the client devices 1010*a-e*, the network device 1006 may consider all the sounding information 1044*a-e* by examining the one feedback table 1046. Furthermore, once the network device 1006 has determined how to group the client devices 1010*a-e*, the network device 1006 may use the feedback table 1046 to determine how to beamform signals to each group 1030*a-b*. Having the sounding information 1044*a-e* may simplify this determination.

The network device 1006 may still take turns when transmitting to the client devices 1010*a-e*, but may be able to send twice as much data to each of the groups 1030*a-b*. For example, the network device 1006 may transmit a frame 1012*a*1 to the client device 1010*a* in the first BSS 1020*a*. The network device 1006 may next simultaneously transmit frames 1012*b*1, 1012*c*1, to the two client devices 1010*b-c*. These frames 1012*b*1, 1012*c*1 may be transmitted without regard to the BSS 920*a-b*. Though the frames 1012*b*1, 1012*c*1 are transmitted together, they are effectively no different than if they had been transmitted separately. The client devices 1010*b-c* are able to extract from the beamformed signal only the data that is part of their own frames 1012*b*1, 1012*c*1. Similarly, the network device 1006 may transmit frames 1012*d*1, 1012*e*1 to the client devices 1010*d-e* in the second group 1030*b*.

Figure 10B:
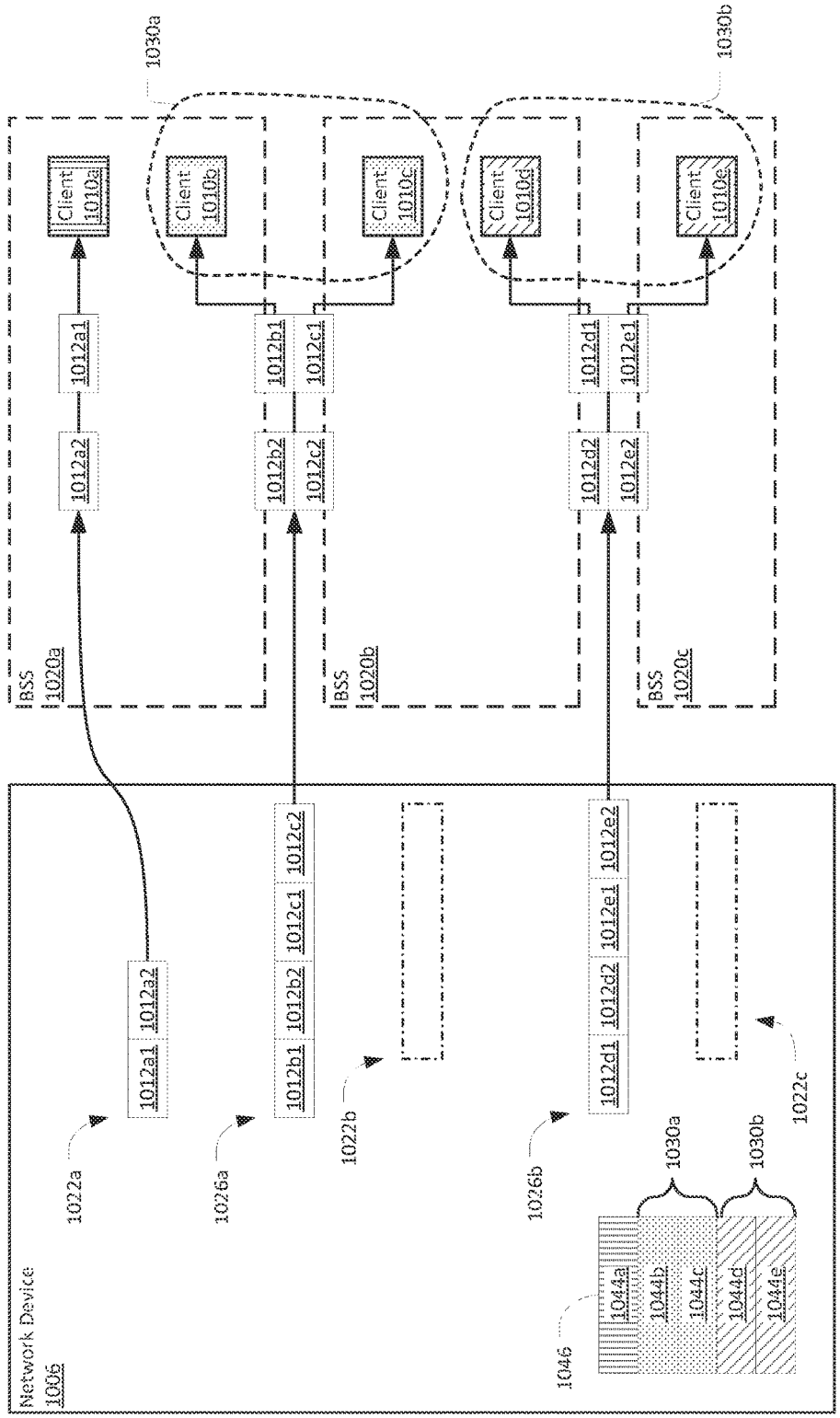
FIG. 10B illustrates an example of an alternative configuration for a network device 1006 that is configured to group client devices across BSS.

FIG. 10B illustrates an example of an alternative configuration for a network device 1006 that is configured to group client devices 1010*a-e* across BSS 1020*a-c*. In this example, instead of maintaining only a single queue for all frames, however, the network device 1006 may include separate queues 1026*a-b* for the MU-MIMO groups 1030*a-b*, in addition to queues 1022*a* for each BSS 1020*a-c*. Maintaining separate queues 1026*a-b* for the MU-MIMO groups 1030*a-b* while also having queues 1022*a-c* for each BSS 1020*a-c* may be simpler to implement, because existing, per-BSS queues 1022*a-c* need not be changed. Here, the BSS 1020*b-c* do not have client devices that are not in a MU-MIMO group, hence the queues 1022*b-c* are empty. Queues 1022*a-c* for each BSS 1020*a-c* and queues for each group 1030*a-b* may also be more efficient. For example, the network device 1006 can issue frames which ever queue 1022*a-c*, 1026*a-b* that has data. For example, the network device 1006 may transmit frames 1012*a*1-2 from the queue 1022*a* for the BSS 1020*a* until the queue 1026*a* for the first group 1030*a* or the queue 1026*b* for the second group 1030*b* has two frames to transmit. The network device 1006 may continue to use one feedback table 1046 so that the network device 1006 can consider the sounding information 1044*a-e* for all the client devices 1010*a-e* at the same time.

FIGS. 11A-11B and 12A-12B illustrate in further detail examples of the improved data throughput to client devices that are grouped to receive MU-MIMO transmissions.

Figures 11A, 11B:
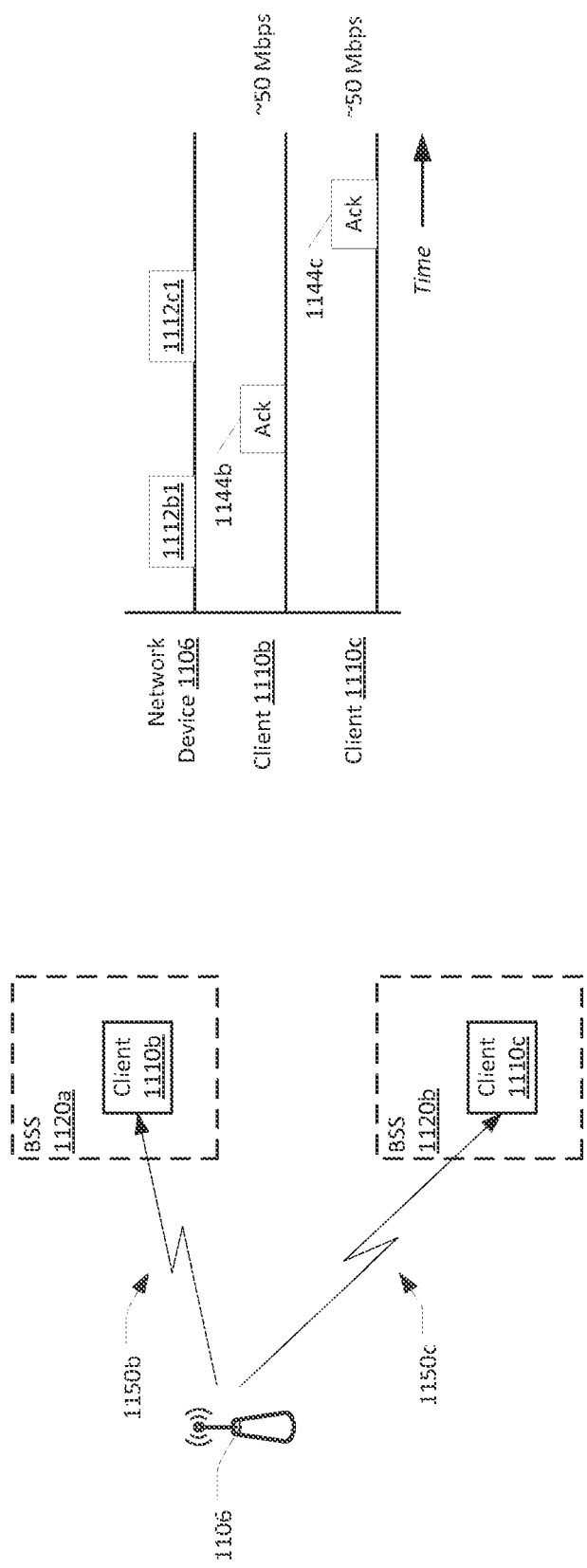
FIG. 11A illustrates an example of network device associated with two client devices that are in different BSS.
FIG. 11B illustrates an example of the rate at which data may be transferred to the client devices in the example illustrated in FIG. 11A.

FIG. 11A illustrates an example of network device 1106 associated with two client devices 1110*b-c* that are in different BSS 1120*a-b*. The client device 1110*b* forms a first BSS 1120*a* with the network device 1106, while the second client device 1110*c* forms a second BSS 1120*a* with the network device 1106. In this example, the client devices 1110*a-b* have not been grouped, and MU-MIMO has not been enabled. The client devices 1110*a-b* are on the same channel, and so the network device 1106 may take turns making individual transmissions 1150*b-c* to each client device 1110*b-c*.

FIG. 11B illustrates an example of the rate at which data may be transferred to the client devices 1110*b-c* in the example illustrated in FIG. 11A. In FIG. 11B, the network device 1106 may first transmit a frame 1112*b*1 to the client device 1110*b*. The client device 1110*b* may respond with an acknowledgement frame 1144*b*, to indicate that it received the frame 1112*b*1 successfully. The network device 1106 may next transmit a frame 1112*c*1 to the client device 1110*c*. The client device 1110*c* may also respond with an acknowledgement frame 1144*c*.

In this example, assuming that the network device 1106 continues to take turns transmitting to each client device 1110*b-c*, both client devices 1110*b-c* may receive data at a rate of, for example, about 50 megabits per second (Mbps). Assuming the network device 1006 is transmitting as much data as fast as possible, the maximum data rate of the channel is about 100 Mbps. This throughput value is provided only as an example; for different client devices and/or different data being transmitted to the client devices the throughput may be different.

Figures 12A, 12B:
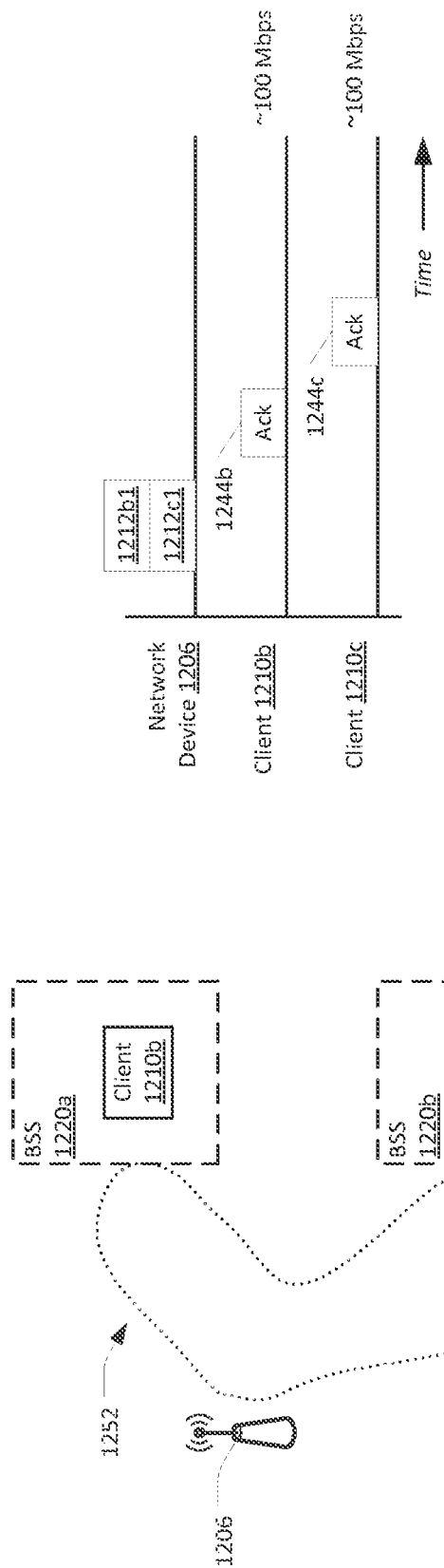
FIG. 12A illustrates an example of a network device that has grouped two client devices, and is transmitting to those client devices with a single, beamformed transmission.
FIG. 12B illustrates an example of rate at which data may be transferred in the example illustrated in FIG. 12A.

FIG. 12A illustrates an example of a network device 1206 that has grouped two client devices 1210*b-c*, and is transmitting to those client devices 1210*b-c* with a single, beamformed transmission 1252. Similar to the prior example, the client device 1210*b* forms a BSS 1220*a* with the network device 1206, and the client device 1210*c* forms a BSS 1220*b* with the network device 1206. In this example, the client devices 1210*b-c* may have similar traffic patterns. The network device 1206 may be configured to group these client devices 1210*b-c*. Once grouped, the network device 1206 may use a single beamformed transmission 1252 signal to transmit frames to the client devices 1210*b-c*.

FIG. 12B illustrates an example of the rate at which data may be transferred in the example illustrated in FIG. 12A. In FIG. 12B, the network device 1206 may transmit a frame 1212*b*1 to the client device 1210*b*, and a frame 1212*c*1 to the client device 1210*c*, at the same time. Each client device 1210*b-c* may respond with acknowledgement frames 1244*b-c*. In this example, each client device 1210*b-c* may now receive frames twice as fast as in the example of FIG. 11B, because in FIG. 12B the network device 1206 need not take turns between the two client devices 1210*b-c*. Thus the client devices 1210*b-c* may now be receiving, for example, 100 Mbps of data. The data rate of the channel in this situation is still 100 Mbps, but aggregate throughput to these two client devices 1210*b-c* is now about 200 Mbps. One benefit of group client devices across BSS can thus be seen in the examples of FIGS. 11A-11B and 12A-12B: the data throughput to the grouped client devices may be improved.

VI. Network Device

Figure 13:
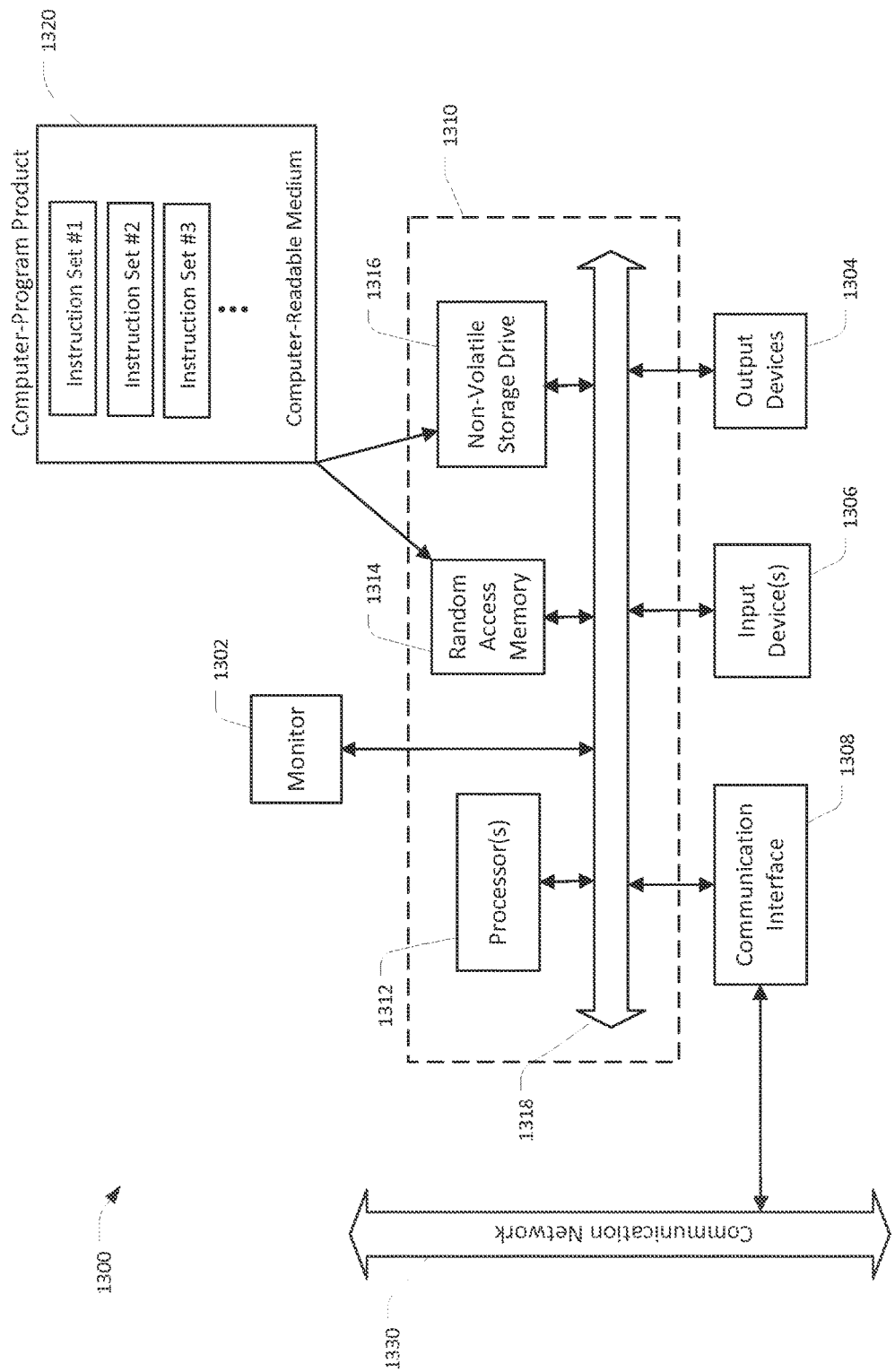
FIG. 13 illustrates an embodiment of a network device.

FIG. 13 illustrates an embodiment of a network device 1300. The above methods may be implemented by computer-program products that direct a network device to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof.

The network device 1300 comprises a processing system 1310, an optional monitor 1302 coupled to the processing system 1310, one or more optional user output devices 1304 coupled to the processing system 1310, one or more optional user input devices 1306 (e.g., keyboard, mouse, track ball, touch screen) coupled to the processing system 1310, an optional communications interface 1308 coupled to the processing system 1310, a computer-program product 1320 stored in a tangible computer-readable memory in the processing system 1310. The computer-program product 1320 directs the network device 1300 to perform the above-described methods. The processing system 1310 may include one or more processors 1312 that communicate with a number of peripheral devices via a bus subsystem 1318. These peripheral devices may include the user output device(s) 1304, user input device(s) 1306, communications interface 1308, and a storage subsystem, such as a random access memory (RAM) 1314 and/or a non-volatile storage drive 1316 (e.g., disk drive, optical drive, solid state drive), which are forms of tangible computer-readable memory.

The computer-program product 1320 may be stored in the non-volatile storage drive 1316 and/or another computer-readable medium accessible to the processing system 1310 and loaded into the memory 1314. Each processor 1312 may comprise a microprocessor, such as a microprocessor from Intel® or Advanced Micro Devices, Inc.®, or the like. To support the computer-program product 1320, the processing system 1310 runs an operating system that handles the communications of the computer-program product 1320 with the above-noted components, as well as the communications between the above-noted components in support of the computer-program product 1320. Exemplary operating systems include ArubaOS from Aruba Networks, Windows® or the like from Microsoft Corporation, Solaris® from Sun Microsystems, LINUX, UNIX, and the like, and/or device- or system-specific operating systems and the like.

The user input devices 1306 may include a keyboard, a keypad, a mouse, a scanner, a digital drawing pad, a touch screen incorporated into the display, audio input devices such as voice recognition systems, microphones, and other types of input devices. In various embodiments, the user input devices 1306 are typically embodied as a computer mouse, a trackball, a track pad, a joystick, wireless remote, a drawing tablet, or a voice command system. The user input devices 1306 typically allow a user to select objects, icons, text and the like that appear on the monitor 1302 via a command such as a click of a button or the like. The user output devices 1304 include devices and mechanisms to output information from the processing system 1310. These may include a display (e.g., a monitor 1302), printers, non-visual displays such as audio output devices, etc.

The communications interface 1308 provides an interface to communication networks 1330 and devices and may serve as an interface to receive data from and transmit data to other systems, WANs and/or the Internet. Embodiments of the communications interface 1308 may be an Ethernet card, a modem, a cable modem, a router, a switch, an embedded multimedia adapter (EMTA), a synchronous or asynchronous digital subscriber line (DSL) unit, a FireWire® interface, a USB® interface, a wireless network adapter, and the like. For example, the communications interface 1308 may be coupled to a computer network, to a FireWire® bus, or the like. In other embodiments, the communications interface 1308 may be physically integrated on a board of the processing system 1310, and/or may be a software program, or the like.

The RAM 1314 and non-volatile storage drive 1316 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 1314 and non-volatile storage drive 1316 may be configured to store the basic programming and data constructs that provide the functionality of various embodiments of the systems and methods described above.

Software instruction sets that provide the functionality of the described methods may be stored in the RAM 1314 and/or non-volatile storage drive 1316. These instruction sets or code may be executed by the processor(s) 1312. The RAM 1314 and/or non-volatile storage drive 1316 may also provide a repository to store data and data structures used in accordance with the disclosed systems and methods. The RAM 1314 and non-volatile storage drive 1316 may include a number of memories including a main random access memory (RAM) to store instructions and data during program execution and a read-only memory (ROM) in which fixed instructions are stored. The RAM 1314 and non-volatile storage drive 1316 may include a file storage subsystem providing persistent (non-volatile) storage of program and/or data files. The RAM 1314 and non-volatile storage drive 1316 may also include removable storage systems, such as removable flash memory.

The bus subsystem 1318 provides a mechanism to allow the various components and subsystems of the processing system 1310 to communicate with each other as intended. Although the bus subsystem 1318 is shown schematically as a single bus, alternative embodiments of the bus subsystem 1318 may implement multiple busses or communication paths within the processing system 1310.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function, to the calling function, or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   transmitting, by a network device, sounding frames to a first plurality of client devices associated with a first access point corresponding to a first basic service set;
   transmitting, by the network device, sounding frames to a second plurality of client devices associated with a second access point corresponding to a second and different basic service set, wherein data frames corresponding to a first subset of the first plurality of client devices and a second subset of the second plurality of client devices share a common traffic characteristic;
   receiving, by the network device, feedback frames indicating how a sounding frame was received from the first and second pluralities of client devices; and
   constructing, by the network device, a feedback table based on the received feedback frames, wherein the feedback table groups the first subset and the second subset of the client devices for beamforming transmissions.

2. The method of claim 1, wherein transmitting the sounding frames further comprises:
   transmitting an announcement frame indicating that channel sounding is starting.

3. The method of claim 1, wherein transmitting the sounding frames further comprises:
   transmitting a training frame that includes training symbols, wherein a feedback frame indicates how the training symbols were received.

4. The method of claim 1, wherein transmitting the sounding frames further comprises:
   transmitting a multi-client sounding frame to a client device associated with the first basic service set when the first basic service set has one client device associated.

5. The method of claim 1, further comprising:
   reshaping the beamforming transmissions using data on relative angles between respective transmission antennas of the network device and receiving antennas of the first subset and second subset of client devices.

6. The method of claim 1, wherein traffic characteristics include a frame size and an inter-arrival time.

7. The method of claim 1, further comprising:
   queuing the data frames associated with the first subset and the second subset of client devices in a single queue for beamforming transmissions.

8. A network device, comprising:
   a memory;
   a processor executing instructions stored in the memory to:
   transmit sounding frames to a first plurality of client devices associated with a first access point corresponding to a first basic service set;
   transmit sounding frames to a second plurality of client devices associated with a second access point corresponding to a second and different basic service set, wherein data frames corresponding to a first subset of the first plurality of client devices and a second subset of the second plurality of client devices share a common traffic characteristic;
   receive feedback frames indicating how a sounding frame was received from the first and second pluralities of client devices; and
   construct a feedback table based on the received feedback frames, wherein the feedback table groups the first subset and the second subset of the client devices for beamforming transmissions.

9. The network device of claim 8, wherein the processor further executing instruction stored in the memory to:
   transmit an announcement frame indicating that channel sounding is starting.

10. The network device of claim 8, wherein the processor further executing instruction stored in the memory to:
    transmit a training frame that includes training symbols, wherein a feedback frame indicates how the training symbols were received.

11. The network device of claim 8, wherein t wherein the processor further executing instruction stored in the memory to:
    transmit a multi-client sounding frame to a client device associated with the first basic service set when the first basic service set has one client device associated.

12. The network device of claim 8, wherein the processor further executing instruction stored in the memory to:
    reshape the beamforming transmissions using data on relative angles between respective transmission antennas of the network device and receiving antennas of the first subset and second subset of client devices.

13. The network device of claim 8, wherein traffic characteristics include a frame size and an inter-arrival time.

14. The network device of claim 8, wherein the processor further executing instruction stored in the memory to:
    queue the data frames associated with the first subset and the second subset of client devices in a single queue for beamforming transmissions.

15. A non-transitory machine-readable storage medium of a network device, including instructions that, when executed by at least one processor, cause the processor to:
    transmit sounding frames to a first plurality of client devices associated with a first access point corresponding to a first basic service set;
    transmit sounding frames to a second plurality of client devices associated with a second access point corresponding to a second and different basic service set, wherein data frames corresponding to a first subset of the first plurality of client devices and a second subset of the second plurality of client devices share a common traffic characteristic;

receive feedback frames indicating how a sounding frame was received from the first and second pluralities of client devices; and construct a feedback table based on the received feedback frames, wherein the feedback table groups the first subset and the second subset of the client devices for beamforming transmissions.

16. The non-transitory machine-readable storage medium of claim 15, further comprising instructions that cause the processor to:

reshape the beamforming transmissions using data on relative angles between respective transmission antennas of the network device and receiving antennas of the first subset and second subset of client devices.

17. The non-transitory machine-readable storage medium of claim 15, further comprising instructions that cause the processor to transmit at least one of:

an announcement frame indicating that channel sounding is starting; and a training frame that includes training symbols, wherein a feedback frame indicates how the training symbols were received.

18. The non-transitory machine-readable storage medium of claim 15, further comprising instructions that cause the processor to transmit a multi-client sounding frame to a client device associated with the first basic service set when the first basic service set has one client device associated.

19. The non-transitory machine-readable storage medium of claim 15, wherein traffic characteristics include a frame size and an inter-arrival time.

20. The non-transitory machine-readable storage medium of claim 15, further comprising instructions that cause the processor to:

queue the data frames associated with the first subset and the second subset of client devices in a single queue for beamforming transmissions.

* * * * *